(12) United States Patent
Hobbs et al.

(10) Patent No.: US 9,351,007 B1
(45) Date of Patent: May 24, 2016

(54) PROGRESSIVE BLOCK ENCODING USING REGION ANALYSIS

(71) Applicant: Teradici Corporation, Burnaby (CA)

(72) Inventors: David Victor Hobbs, Surrey (CA); Patrick Ratto, Burnaby (CA)

(73) Assignee: Teradici Corporation, Burnaby, British Columbia (CA)

( * ) Notice: Subject to any disclaimer, the term of this patent is extended or adjusted under 35 U.S.C. 154(b) by 0 days.

(21) Appl. No.: 14/678,607

(22) Filed: Apr. 3, 2015

Related U.S. Application Data

(63) Continuation of application No. 13/722,105, filed on Dec. 20, 2012, now Pat. No. 9,020,045, which is a continuation of application No. 11/549,577, filed on Oct. 13, 2006, now Pat. No. 8,345,768, which is a continuation-in-part of application No. 11/537,545, filed on Sep. 29, 2009, now Pat. No. 8,107,527, and a continuation-in-part of application No. 11/333,955, filed on Jan. 17, 2006, now Pat. No. 7,747,086, said application No. 11/549,577 is a continuation-in-part of application No. 11/532,865, filed on Sep. 18, 2006, now Pat. No. 7,822,278, said application No. 11/537,545 is a continuation-in-part of application No. 11/532,865, filed on Sep. 18, 2006, now Pat. No. 7,822,278, and a continuation-in-part of application No. 11/333,955, filed on Jan. 17, 2006, now Pat. No. 7,747,086, said application No. 11/532,865 is a continuation-in-part of application No. 11/333,955, filed on Jan. 17, 2006, now Pat. No. 7,747,086.

(60) Provisional application No. 60/703,767, filed on Jul. 28, 2005, provisional application No. 60/719,050, filed on Sep. 20, 2005, provisional application No. 60/726,418, filed on Oct. 12, 2005.

(51) Int. Cl.
*H04N 19/176* (2014.01)
*H04N 19/154* (2014.01)
*H04N 19/164* (2014.01)
*H04N 19/196* (2014.01)
*H04N 19/103* (2014.01)

(52) U.S. Cl.
CPC ........... *H04N 19/154* (2014.11); *H04N 19/103* (2014.11); *H04N 19/164* (2014.11); *H04N 19/176* (2014.11); *H04N 19/196* (2014.11)

(58) Field of Classification Search
None
See application file for complete search history.

(56) References Cited

U.S. PATENT DOCUMENTS

| 6,356,663 | B1 * | 3/2002 | Korta | G06T 9/007 |
| | | | | 382/239 |
| 2002/0136460 | A1 * | 9/2002 | Bottou | G06T 9/00 |
| | | | | 382/224 |

(Continued)

*Primary Examiner* — Kevin McInnish
(74) *Attorney, Agent, or Firm* — Moser Taboada

(57) ABSTRACT

Methods of encoding an image stream. In one embodiment, the method comprises analyzing, for each block in a plurality of image blocks, changes from the same block in previous image frames; classifying each block as a non-video block if it has changed from a corresponding block in an immediately previous frame; re-classifying each non-video block as a video block if it meets video block requirements; encoding each non-video block having a first image type to a lossless quality level; encoding each non-video block having a second image type to a first lossy quality level; and encoding each video block to a second lossy quality level, wherein each of the lossless quality level, the first and the second lossy quality levels define a measurable image quality level of a decoded output of a corresponding block at a client computer, wherein the image frame comprises separate video insert, text and picture portions.

5 Claims, 25 Drawing Sheets

(56) References Cited

U.S. PATENT DOCUMENTS

2004/0001634 A1* 1/2004 Mehrotra .................. G06T 9/00
  382/232
2006/0182354 A1* 8/2006 Iwamura ............... G06F 3/1462
  382/232
2006/0206820 A1* 9/2006 Bullard ................... H04L 69/04
  715/733

* cited by examiner

Progressive Encoding System

Block Encoder

FIG. 6

| | | Blocks at Present Quality | Desired Coding Quality Level | | | | | | |
|---|---|---|---|---|---|---|---|---|---|
| | | | 0 | 1 | 2 | 3 | 4 | 5 | 6 |
| Present Coding Quality Level | 0 | $k_0$ | 0 | $a_{01}$ | $a_{12}$ | $a_{23}$ | $a_{34}$ | $a_{45}$ | $a_{56}$ |
| | 1 | $k_1$ | | 0 | | | | | |
| | 2 | $k_2$ | | | 0 | | | | |
| | 3 | $k_3$ | | | | 0 | | | |
| | 4 | $k_4$ | | | | | 0 | | |
| | 5 | $k_5$ | | | | | | 0 | |
| | 6 | $k_6$ | | | | | | | 0 |
| | | Total K | | $B_1$ | $B_2$ | $B_3$ | $B_4$ | $B_5$ | $B_6$ |

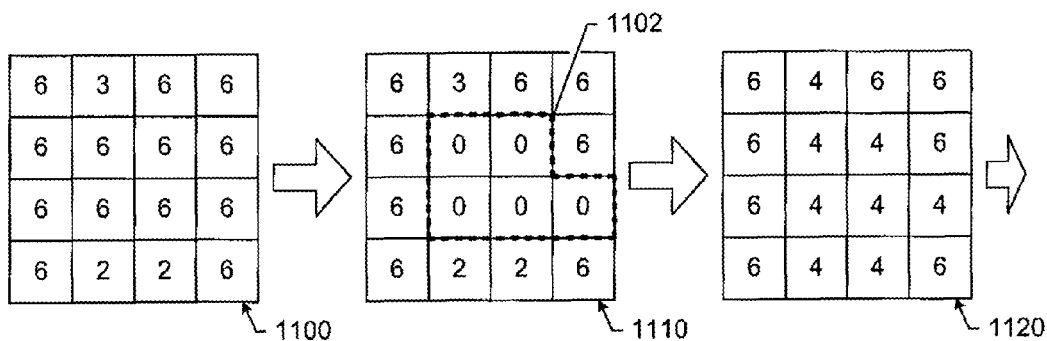

FIG. 13
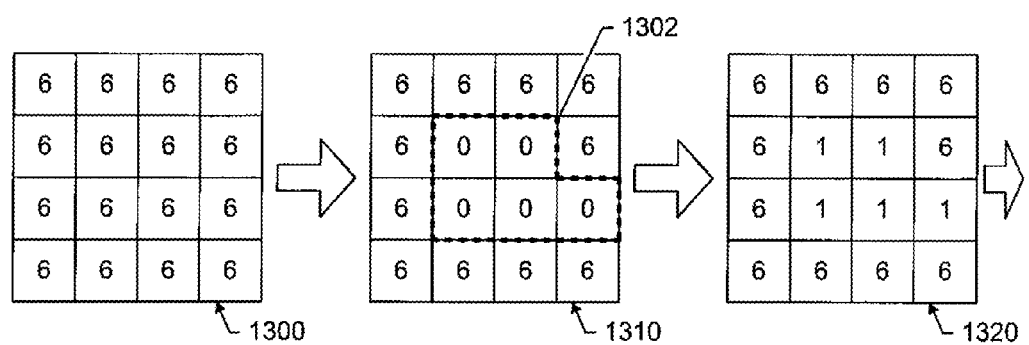
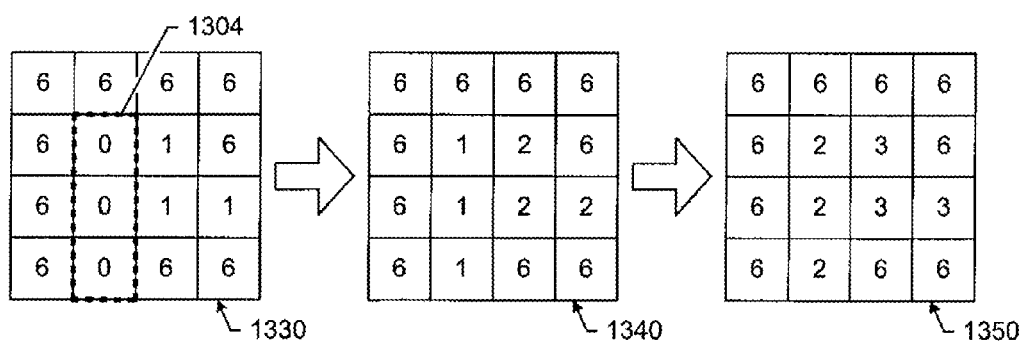

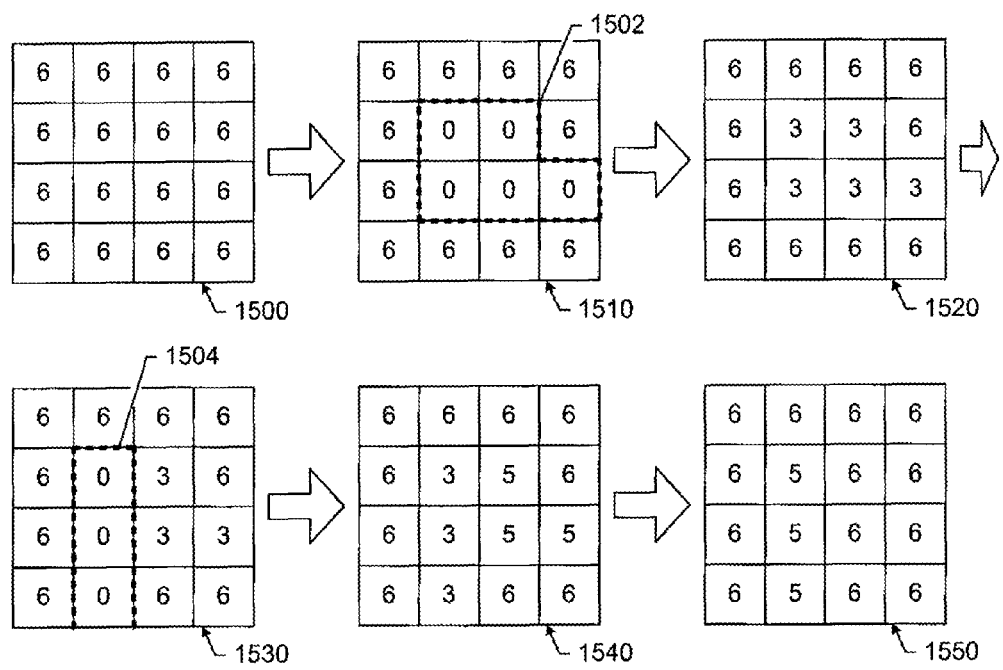

FIG. 17
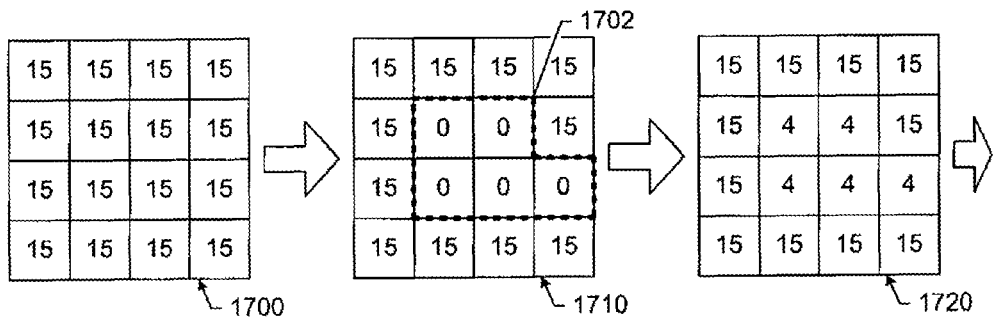
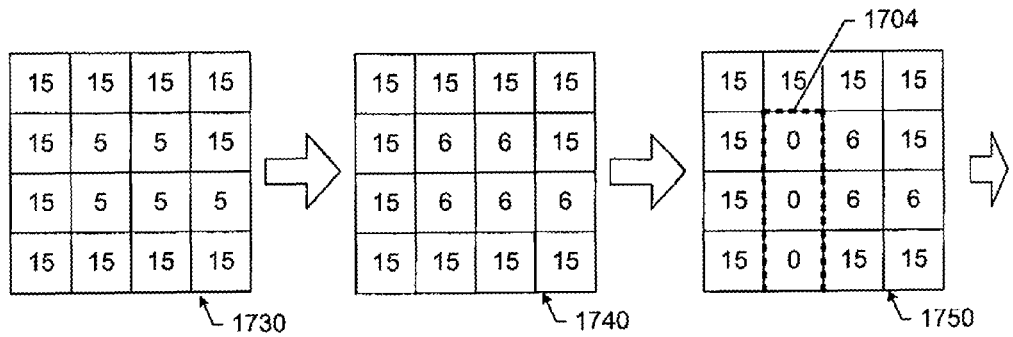
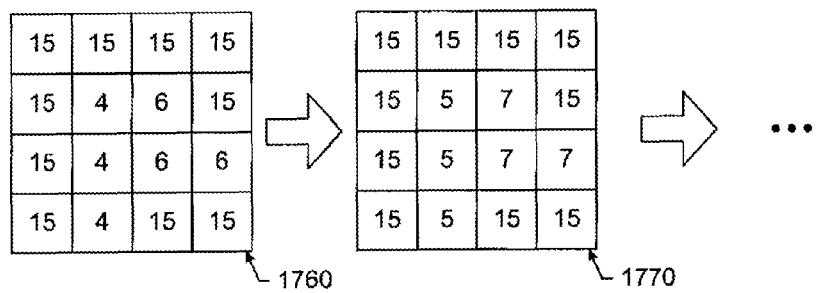

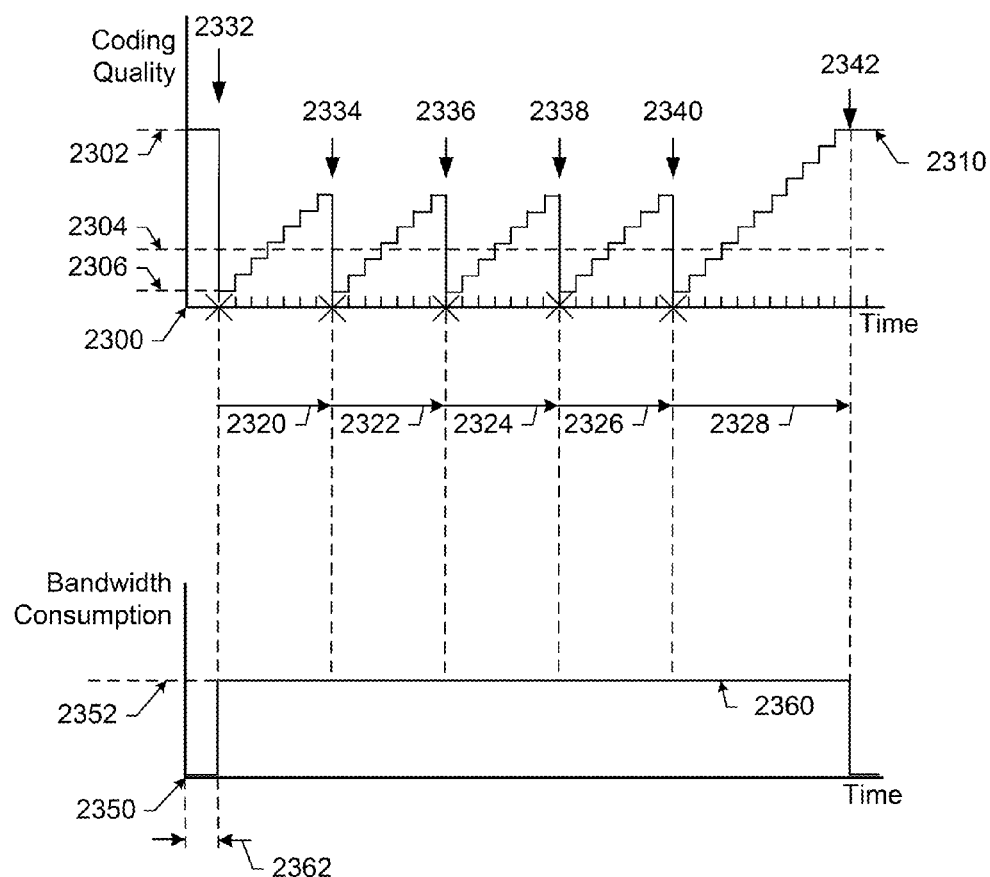

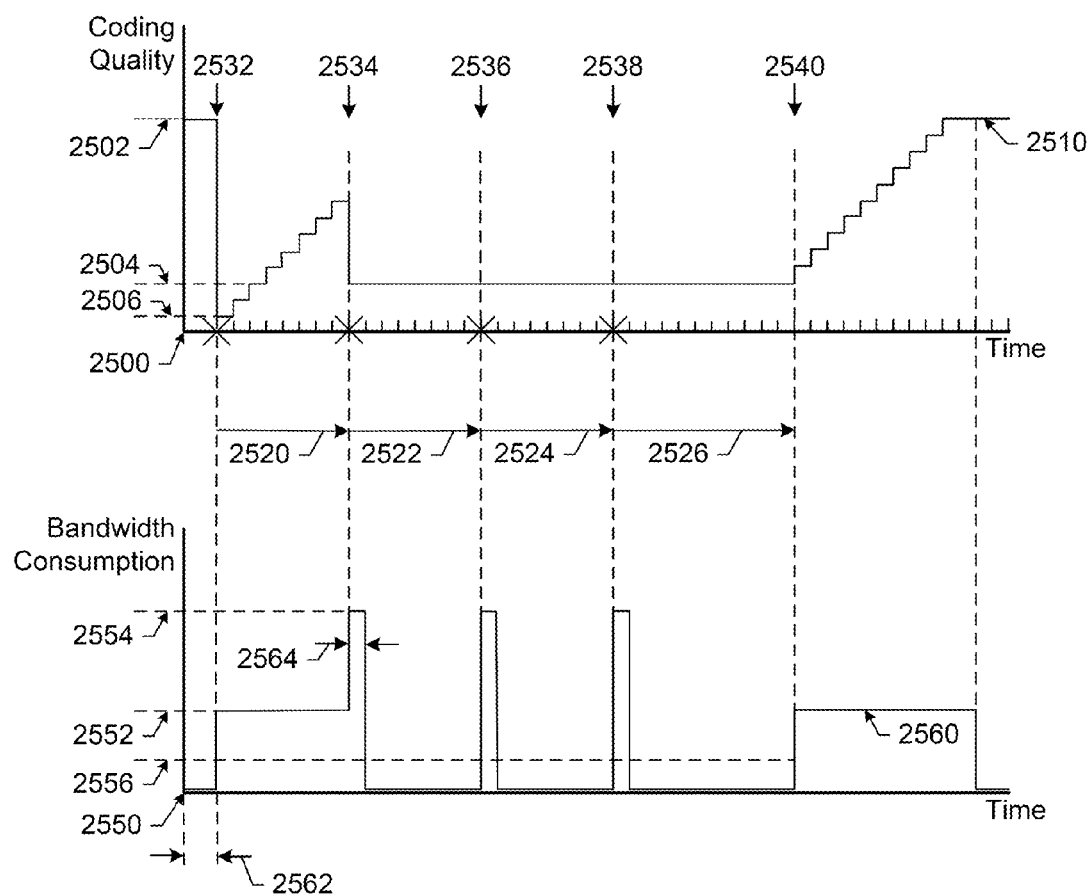

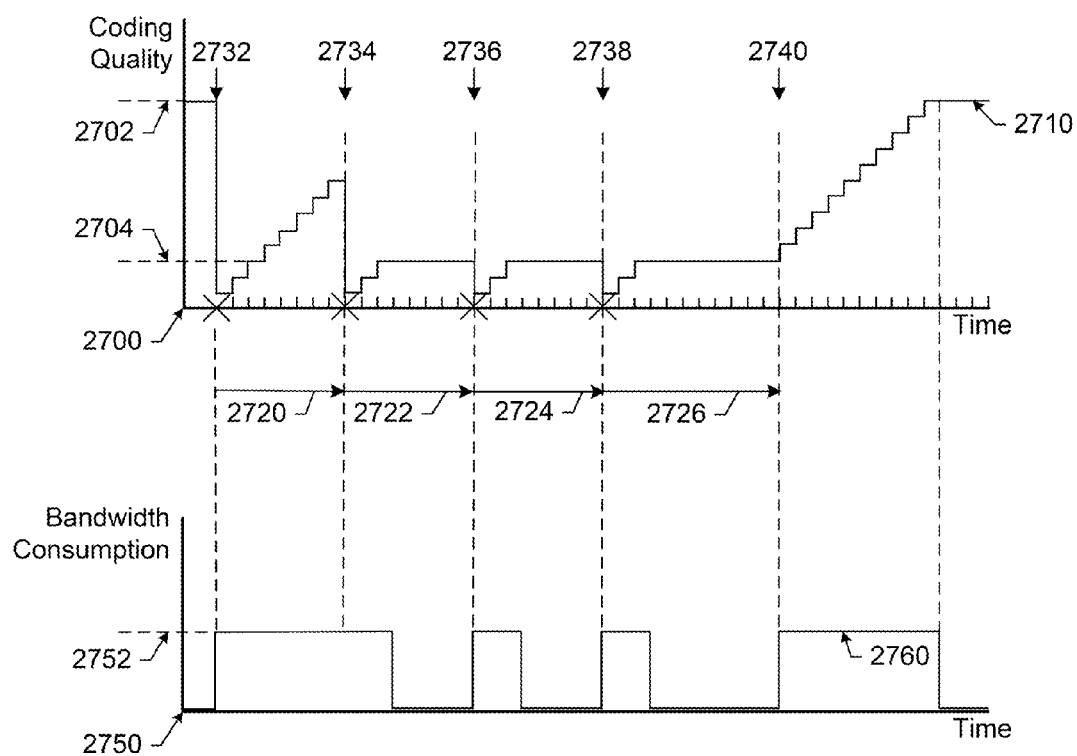

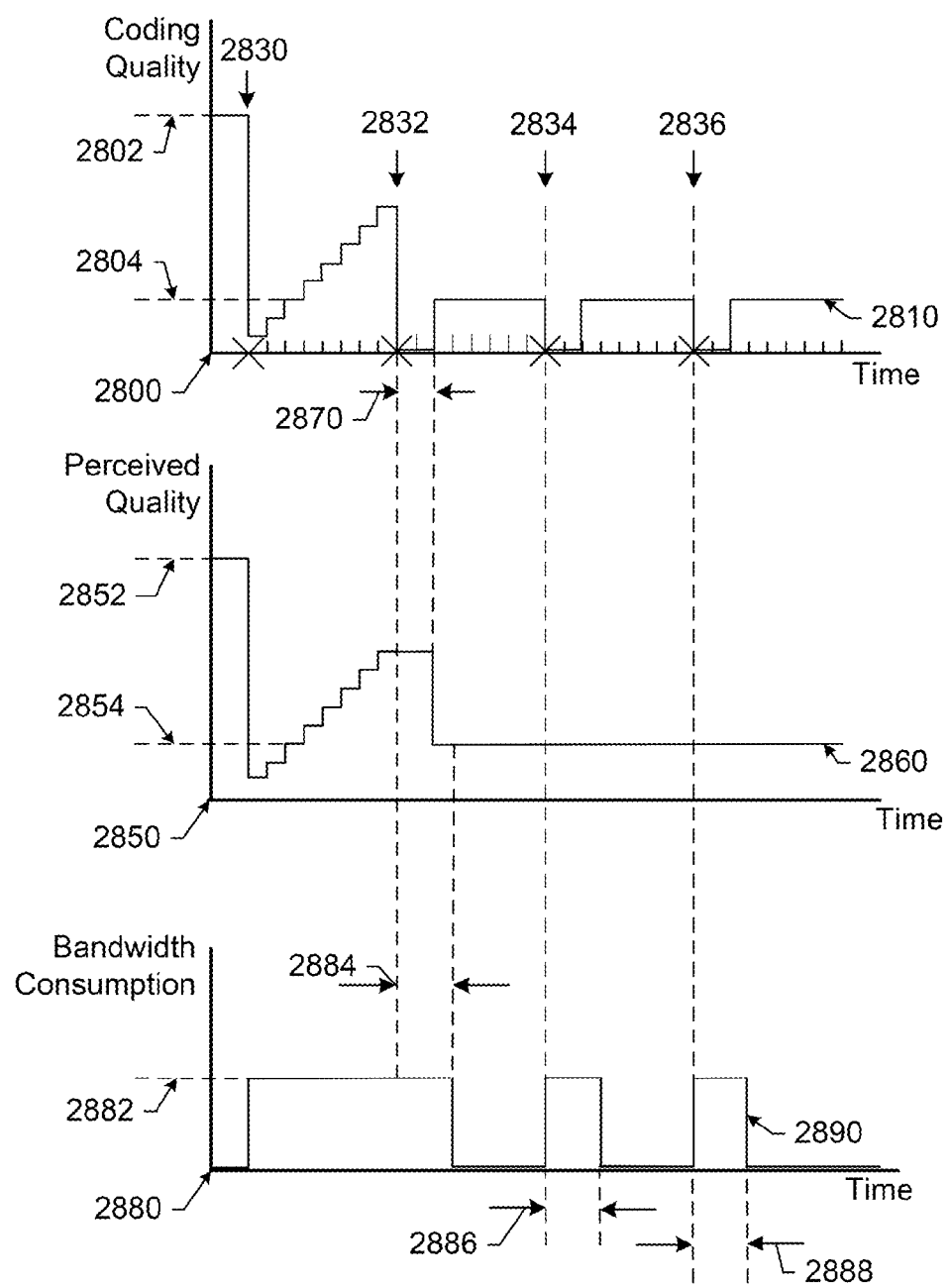

PROGRESSIVE BLOCK ENCODING USING REGION ANALYSIS

CROSS-REFERENCE TO RELATED APPLICATIONS

This application is a continuation of co-pending U.S. patent application Ser. No. 13/722,105, filed Dec. 20, 2012, entitled "Progressive Block Encoding using Region Analysis". U.S. patent application Ser. No. 13/722,105, filed Dec. 20, 2012, is a continuation of U.S. patent application Ser. No. 11/549,577, filed Oct. 13, 2006, entitled "Progressive Block Encoding using Region Analysis" (now U.S. Pat. No. 8,345,768, issued Jan. 1, 2013). U.S. patent application Ser. No. 11/549,577, filed Oct. 13, 2006, now U.S. Pat. No. 8,345,768 issued Jan. 1, 2013, is (i) a Continuation-in-Part of U.S. Pat. No. 8,107,527, issued Jan. 31, 2012; and is (ii) a Continuation-in-Part of U.S. Pat. No. 7,747,086, issued Jun. 29, 2010, which claims the benefit of U.S. Provisional Patent Application Ser. No. 60/703,767, filed Jul. 28, 2005; and is (iii) a Continuation-in-Part of U.S. Pat. No. 7,822,278, issued Oct. 26, 2010, which claims the benefit of (a) U.S. Provisional Patent Application Ser. No. 60/719,050, filed Sep. 20, 2005, and of (b) U.S. Provisional Patent Application Ser. No. 60/726,418, filed Oct. 12, 2005; and U.S. patent application Ser. No. 11/549,577, filed Oct. 13, 2006, now U.S. Pat. No. 8,345,768 issued Jan. 1, 2013, claims priority to U.S. Provisional Patent Application Ser. No. 60/726,418, filed Oct. 12, 2005. U.S. Pat. No. 8,107,527, issued Jan. 31, 2012, is (I) a Continuation-in-Part of U.S. Pat. No. 7,822,278, issued Oct. 26, 2010, and is (II) a Continuation-in-Part of U.S. Pat. No. 7,747,086, issued Jun. 29, 2010, and (III) claims the benefit of U.S. Provisional Patent Application Ser. No. 60/726,418, filed Oct. 12, 2005. U.S. Pat. No. 7,822,278, issued Oct. 26, 2010 is a Continuation-in-Part of U.S. Pat. No. 7,747,086, issued Jun. 29, 2010. Each of the aforementioned related patent applications is herein incorporated by reference in its entirety.

FIELD

The invention relates generally to methods for encoding graphics signals for communication across a transmission medium. More particularity, the invention relates to methods for encoding persistent regions of a computer display image for progressive transmission to a remote user interface.

BACKGROUND

There is a growing desire in many workplace and other environments to separate the display of a computer system from the application processing parts. In the desired configuration, the display is physically located at the user's desktop, while the processing components of the computer are placed in a central location. The display is then connected to the data processor with some method of communication such as a computer network.

Various methods have been proposed to transfer display content across a network, including transferring graphic commands or encoded pixel maps representing the display image. These methods are acceptable for the transfer of less dynamic content such as text, background and pictures but are poorly suited to the transfer of dynamic video inserts. Video is usually not rendered using graphics commands so such commands aren't available for transfer. The transfer of compressed video would place a burden of full-featured decoding application software and hardware at the remote display and pixel transfer methods would easily saturate a corporate network unless the content was re-compressed.

Optimized methods for transferring areas of rapidly changing image content surrounded by other areas with different image types such as a video insert surrounded by pictures and text have not been addressed by prior art. Video content poses a unique problem in that it generates too much data for raw transfer across a network, is unsuitable for static image compression methods such as JPEG2000 and conventional video encoders such as H.264 or MPEG-4 FGS are complex, intrusive and inefficient to implement, especially considering the infrequent requirement for such encoding in many computing environments. Moreover, a video clip on a computer display is usually derived from a compressed source such as a DVD or broadcast network. A second video encoding phase adds unwanted latency and further reduces image quality. Additionally a standard encoded video stream would mandate a video decoder at the display system which is in conflict with cost and maintenance objectives associated with remote display systems.

Hybrid methods such as MJPEG developed to improve random access are capable of transmitting a series of independent JPEG images without applying inter-frame prediction methods. These methods offer limited compression and tend to consume high network bandwidth in applications such as standard video operating at high frame rates. Therefore they remain best suited to specialized applications like broadcast resolution video editing or surveillance systems where the frame rate is low. One variation on MJPEG uses differential encoding so that only changed DCT coefficients are encoded. However, in a video application, much of the content changes on every frame rendering this method ineffective.

In summary, existing methods developed specifically to transfer computer display images are not effective methods for transferring video. Still image and video compression techniques lack the necessary compression capabilities, require intrusive components or increased complexity. This results in higher equipment and maintenance costs and lower performance. Therefore, it is desirable to innovate new methods for transferring video sequences across computer networks to remote display systems.

SUMMARY

The present invention provides methods for managing the bandwidth required to communicate raster graphics sequences of constant input frame rates across a band-limited transmission channel. One example of a sequence is a video display clip playing on a computer display. In such a case, a rasterized video sequence has content updates that occur at a constant frame rate independent of the computer display refresh rate. The specification describes various progressive encoding sequences that address the unique challenge of re-encoding and transmitting one or more rasterized video sequences in a compound image region comprising different image types.

In one aspect, the present invention describes methods for managing a progressive encoding sequence so that constant bandwidth consumption is achieved. A display area identified as video type is incrementally improved to a perceptually acceptable quality level over a number of display update cycles. Unlike existing methods, this progressive build method defines a progression for the video area that is optimized to operate at a constant bandwidth dictated by the available network bandwidth.

In another aspect, the present invention describes methods for managing a progressive encoding sequence such that a constant video quality at low latency is maintained. Video areas are immediately built to a perceptually acceptable quality level and then maintained at a constant quality until the next frame update occurs. Unlike existing methods, this method provides constant quality while explicitly preserving network bandwidth for other high priority updates in the region.

In another aspect, the present invention describes methods for managing a progressive encoding sequence such that bandwidth waste is minimized. The progressive build of a video frame is curtailed at a perceptually acceptable quality level before content detail expected to be superseded before human recognition is encoded.

In another aspect, the present invention describes methods for managing a progressive encoding sequence so that the perceptual quality at a display is increased by delaying the display of image frames for a period that allows content related to the next frame to be queued at the decoder, thereby maintaining a constant perceived quality.

In another aspect, the present invention describes methods for delaying a progressive encoding sequence that prevents premature engagement of lower quality video encoding. This method is useful for ensuring that complex non-video images are built using high quality encoding methods.

In some cases the described methods may be used to build the quality of an image at a faster rate than the eye can process, enabling the progressive encoding, transmission and remote building of images at a rate that appears perceptually lossless to the viewer.

In summary, the progressive encoding methods described address the unique problem of transferring computer video sequences. Unlike change-detect methods such as video encoders or frame buffer comparison methods, the progressive encoding sequences allows control over bandwidth and quality at a sub-frame level that minimize bandwidth waste by reducing the transmission of imperceptible image information. Unlike other remote display methods such as command transfer or frame buffer copy methods, these sequences operate completely independently from the data processing system.

Many other features and advantages of the present invention will be apparent from reading the following detailed description, when considered in conjunction with the accompanying drawings, in which:

BRIEF DESCRIPTION OF THE DRAWINGS

FIG. 6 shows an embodiment of a region summary and analysis table;

FIG. 10 presents a bandwidth analysis table and method for progressing the coding quality of a region by moving all changed blocks to a same desired coding quality level;

FIG. 11 illustrates a progression for a region of 4×4 blocks to a same quality level;

FIG. 12 presents a bandwidth analysis table and method for progressing the coding quality of a region by updating all changed blocks by a same increment;

FIG. 13 illustrates a progression for a region of 4×4 blocks using a same coding quality increment for all changed blocks;

FIG. 14 presents a bandwidth analysis table and method for progressing the coding quality of blocks using a proportional coding quality increment;

FIG. 15 illustrates a progression for a region of 4×4 blocks using a proportional coding quality increment;

FIG. 17 illustrates a progression for a region of 4×4 blocks using a proportional coding quality increment;

FIG. 24 shows a bandwidth analysis table that may be used to maintain a constant bandwidth sequence;

FIG. 25 plots the result of an encoding sequence that maintains constant bandwidth consumption for a series of blocks;

FIG. 26 shows a bandwidth analysis table that may be used to maintain a constant quality level video sequence;

FIG. 27 plots the results of an encoding sequence that maintains constant quality levels for a series of blocks of video type;

FIG. 28 shows a bandwidth analysis table used to maintain a video sequence that minimizes bandwidth waste;

FIG. 29 plots the result of an encoding sequence that minimizes bandwidth waste for a series of blocks of video type;

FIG. 30 is a variation on a constant video quality sequence that maintains a constant perceived quality after content transition by delaying the decode of the new content by a number of frames;

DETAILED DESCRIPTION

The invention is well suited to the encoding of bit-exact image sequences, where high perceptual quality is important. One example is a computer display image encoding application.

Figure 1:
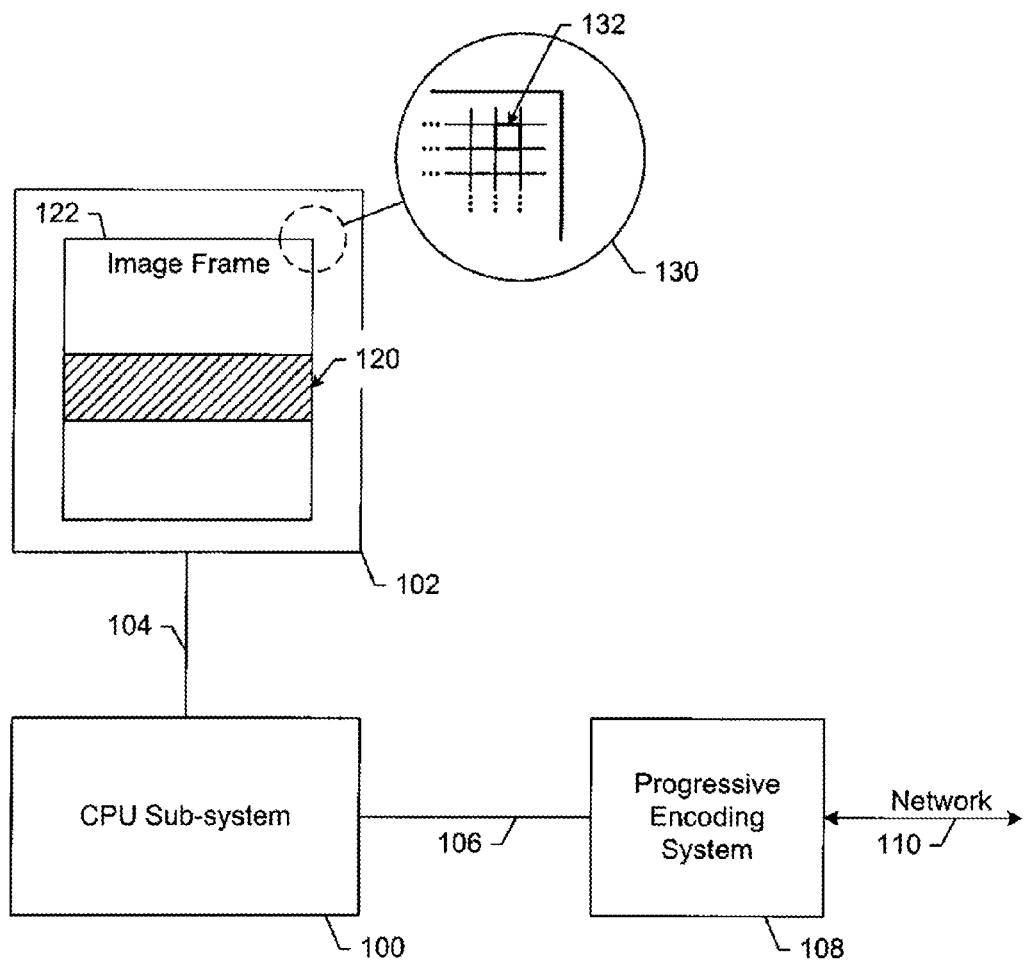
FIG. 1 shows a progressive encoding system connected to an image transfer bus of a CPU sub-system as may be used for the encoding of a computer display image stream.

FIG. 1 shows a progressive encoding system connected to an image transfer bus of a CPU sub-system as may be used for the encoding of a computer display image stream. An embodiment of an associated remote system is described below and illustrated in FIG. 4. Standard CPU sub-system 100 includes one or more processors, a chipset and optional GPU. Standard CPU sub-system 100 connects to memory sub-system 102 using memory bus 104. Memory 102 stores a pixel map image.

In one embodiment, standard CPU sub-system 100 transmits the image as a display signal across image transfer bus 106 to progressive encoding system 108 where the image is processed using methods described below. Digital raster embodiments of image transfer bus 106 include Digital Visual Interface (DVI), Digital Packet Video Link (DPVL), DisplayPort, Unified Display Interface (UDI) and other digital raster formats. A VGA embodiment of image transfer bus 106 is also feasible in applications where a limited resolution is acceptable. In an alternative embodiment, bus 106 also communicates additional information such as image type information and bandwidth availability information to system 108.

In another embodiment, progressive encoding system 108 systematically reads the image. In this case, progressive encoding system 108 accesses memory sub-system 102 using hardware or software-based screen scraping methods may be tightly integrated with CPU sub-system 100. One example of a tightly integrated system is a software method where progressive encoding system 108 is a software application running on CPU sub-system 100.

Progressive encoding system 108 is connected to network 110 where network 110 is a computer network such as a corporate LAN. Packets containing encoded image information are transferred to a remote decoding and display system across network 110.

In the present embodiment, image transfer bus 106 communicates a display image stream comprised of an ongoing sequence of image frames and progressive encoding system 108 takes a regional approach to encoding the image stream. In the embodiment, an image region (shown as shaded region 120) is a "slice" across image frame 122 where frame 122 comprises a defined number of sequential rows of a raster. Alternatively, a region may be an entire frame. A single frame may also have different defined regions of different shapes. However, image region 120 should remain at a constant position from frame to frame so that precisely identified areas may be encoded using the progressive encoding methods described herein. Region 120 is further divided into a set blocks as shown in insert 130 where image block 132 is identified as a typical block. A block defines a unit area for tracking an image and each block is comprised of 8×8 pixels but other embodiments are feasible. By operating at a block level compared to a pixel level, the number of system parameters in progressive encoding system 108 is reduced and multiple pixels may be combined and encoded together using transform encoding techniques such as DCT coding. Progressive encoding methods may be implemented by defining a block structure for the progressive encoding phase that is physically aligned with the grid structure of a block-transformed image resulting from the transform phase. Alternative embodiment uses smaller block sizes, for example a single pixel, but this requires transform encoding to be managed across multiple blocks.

Pixels of the same pixel type in an image block that change at the same time are managed as a single entity using masks to identify pixels included in a set. In one embodiment pixels are pre-classified as having an identified pixel type such as video, text, picture, or background type using standard image decomposition methods. In the embodiment, all block in a region may be subject to the same progressive encoding sequence but individual blocks may be at different states of progression as a result of pixels changing at different times. In an alternative embodiment, blocks in a region may be subject to different progressive encoding sequences based on image type. In such a case, different progressive sequences may be executing simultaneously and different blocks may be at different states of progression within each sequence method. As an example, a region may be classified as having two picture areas (e.g., JPEG pictures) changing at different times, a text area (e.g., Display of a word processing screen) and a video sequence (e.g., An MPEG clip). In this example, blocks classified as text might be assigned a high priority rapid build sequence to lossless coding quality level, all blocks classified as pictures might be subjected to a slow progression to a high coding quality using a different sequence and blocks classified as video might be subjected to a rapid progression to a lower coding quality level to limit the bandwidth consumed by video. Note that this specification uses the term "coding quality level" to define a numerical value used to set a measurable image quality level at the decoded output of a progressive encoding system.

Many of the advantages of individual pixel state management are gained by using block masks to group pixels and overheads of transmitting and storing the individual pixel information are avoided.

Figure 2:
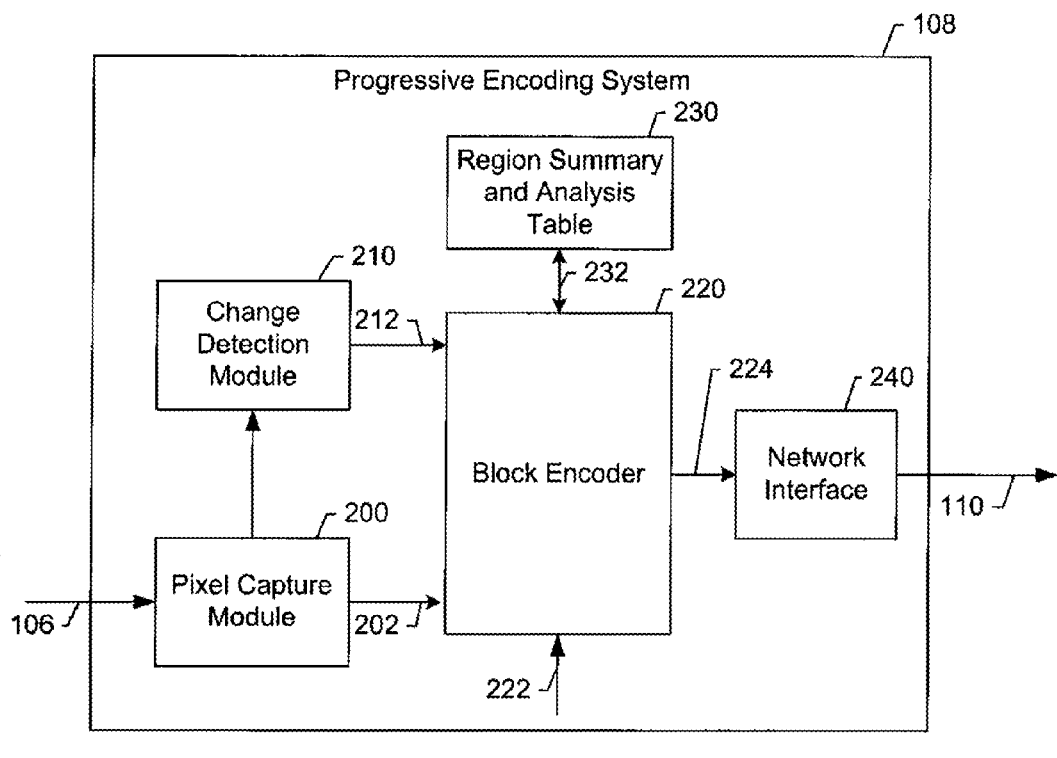
FIG. 2 is a diagram of a progressive encoding system used to encode blocks based on regional progressive encoding priorities.

FIG. 2 is a diagram of system 108 in FIG. 1 used to encode blocks based on regional progressive encoding priorities prior to transmission across network 110. In the embodiment shown, pixel capture module 200 receives an incoming display signal on bus 106. Module 200 forwards the pixels to change detection module 210 and block encoder 220. Module 210 detects changes to image block (ref. Block 132 in FIG. 1) using any efficient pixel block detection method. In one embodiment, module 210 calculates hash codes for 8×8 pixel blocks, which is a convenient dimension for discrete cosine transformation calculations. The hashing function calculates a partial hash code for a horizontal raster line sequence of 8 incoming pixels from pixel capture module 200 (i.e., the hashing function is repeatedly executed and a new partial value generated as each pixel is received). Starting with the first line in a horizontal scan, a partial hash code is calculated for the first 8 pixels in the line. Once the partial code has been calculated, it is stored in a local memory buffer and the hashing function calculates and stores a new partial code for the next 8 pixels in the line. This sequence is repeated until the end of the line of pixels in the scan. When the second scan line is initiated, the partial hash code for the first 8 pixels of the first line is retrieved from the memory buffer and the code is updated to include the first 8 pixels in the new line directly below the first line. This sequence is repeated for the rest of the second line and for all 8 lines. Once a hash code has been calculated for an 8×8 block of pixels, the code is compared with a hash code for the same block the previous image frame. A persistent image block is detected if a recent hash code is the same as a previous hash code. If the hash codes differ, module 200 signals encoder 220 to initialize a progressive build state for the current block using change detection signal 212.

Module 210 may also incorporate circuitry or embedded software functionality to identify additional image attributes. In one embodiment, module 210 includes standard image decomposition filters capable of identifying different static properties including image types such as backgrounds, pictures, icons or text. In this case, image type attributes are also forwarded to encoder 220. In another embodiment, module 210 includes a function that analyses block change frequency in order to identify if the block includes a video sequence. In a case where a block is identified as changing at an anticipated video frame refresh rate (e.g., 30 frames per second), module 210 uses signal 212 to update encoder 220 with this additional block information. In another embodiment, graphic commands executing on sub-system 100 (ref. FIG. 1) that generate the image are monitored for information that describes image type (e.g., Video sequences, photographs, text etc.). These image type indicators are then forwarded over connection 106 to system 108.

Module 200 also forwards incoming digitized display data to encoder 220 over pixel bus 202. Encoder 220, described in detail below and illustrated in FIG. 3, buffers regions of image blocks and uses region summary and analysis table 230 to determine encoding priorities for each block in a region. Table 230 is a memory structure that stores pixel and block information enabling an analysis of input change data. One example is information indicating that progressive encoding is underway but image blocks are not in a lossless state. Another example is block change and type information. Pixels that are continuously changing and are of picture type are probably related to a video sequence and may be better suited to video encoding than progressive block encoding methods or they may be suited to variations on progressive encoding that limit bandwidth consumption at the cost of image quality. In this case table 230 may be decomposed into sub-tables supporting different image types. As another example, transform method may be important. For example, if a DCT transform algorithm is used, the progressive encoding of all pixels in a block may be necessary if any pixels change. Various embodiments of table 230 are described below and illustrated in FIG. 6.

Encoder 220 is also provided bandwidth information as signal 222 to support the computation of encoding levels. Bandwidth information may be a register value initialized to a fixed allocation for each region or it may be a variable that can be updated by sub-system 100 or external equipment such as traffic management equipment. In one embodiment, available bandwidth is dependent on the status of other regions and is updated once earlier regions have been analyzed.

Image blocks are encoded and forwarded to network interface 240 across bus 224. Network interface 240 hosts a standard networking protocol stack (e.g., TCP/IP) and provides a physical interface such as Ethernet to network 110. Network interface 240 performs network-layer encapsulation of the encoded data and transmits the data to a remote system such as that described herein and illustrated in FIG. 4.

Figure 3:
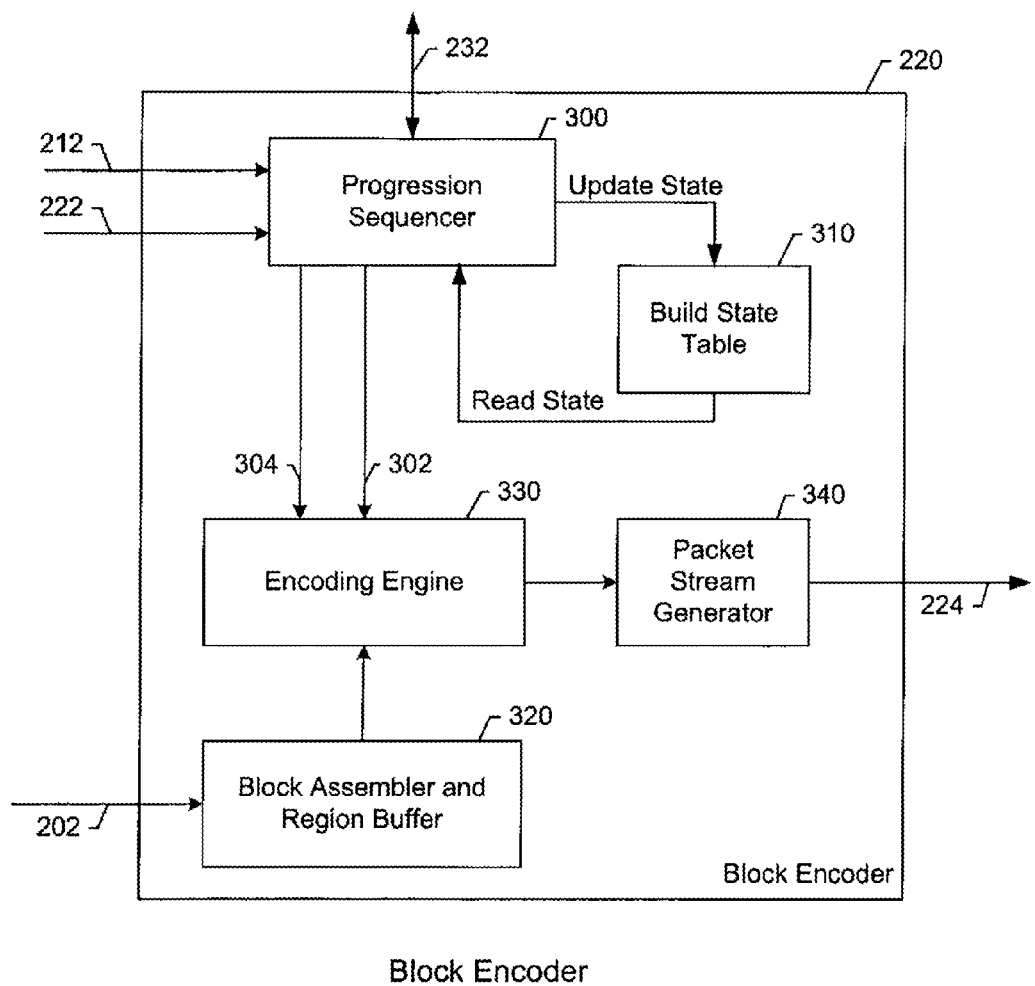
FIG. 3 shows the architecture for an embodiment of a block encoder.

FIG. 3 shows an embodiment of encoder 220 in FIG. 2. In the embodiment, progression sequencer 300 controls encoding methods and manages the build states of incoming image blocks. State sequencer 300 applies one or more of the sequencing methods described herein to determine the next build state for an image block based on signal 212, the build state for an image block as stored in build state table 310, a regional summary as stored in table 230 and bandwidth information 222. In an alternative embodiment, sequencer 300 uses additional information such as image type to determine an encoding method and sequence.

In the embodiment shown, block assembler and region buffer 320 assembles incoming pixels on bus 202 into image blocks of 8×8 pixels and stores them locally. Note that pixels on bus 202 arrive at encoder 220 in advance of change detection signal 212 for the same block hence the requirement to buffer the pixel stream. Signal 212 signals which blocks in a region have changed compared with the same blocks in the previous frame and that a new encoding sequence for those blocks should be initiated. If a block has changed, an entry for the block is flagged accordingly using a change detection mask in build state table 310 that is also used to record the current state of each image block. In an alternative embodiment, table 310 also records the number of frames that have passed since the input image has changed. Image blocks that changed in a much earlier frame but have not reached a lossless state may receive a higher priority bandwidth allocation as described herein and illustrated in FIG. 22.

Sequencer 300 retrieves stored region information from table 230 that provides a build state summary for blocks in the region and bandwidth estimates to advance blocks to higher quality levels. Sequencer 300 searches the change detection mask in table 310 for bits indicating changed blocks and updates table 230. Sequencer 300 then performs a bandwidth analysis using the methods described herein and illustrated in FIG. 9 and selects a next coding quality level for each block in the region.

Each block is then encoded by encoding engine 330 under control of sequencer 300. In the present embodiment, engine 330 is a selectable quality encoding engine that obtains a specified encoding method (ref. Encoder method signal 302) from sequencer 300 to process blocks in buffer 320. In the embodiment, image blocks are transformed into layered bit-planes using standard DCT transform methods.

Sequencer 300 specifies a desired coding quality level using desired coding quality signal 304. Signal 304 determines the number of quality levels to be encoded for each block based on the previous quality level (as recorded in table 310), available bandwidth 222, state of other blocks in the region and selected progression sequence. Sequencer 300 also specifies an encoding domain using encoder method signal 302. Once the region has been processed, the new build state for each block is updated in table 310 and table 230 (in FIG. 2) is updated to reflect a summary of the region state.

Packet stream generator 340 then builds encoded packets for transmission using the designated encoded bit planes and transmits them on bus 224. In an alternative embodiment, the remaining bit planes are temporarily stored in buffer 320 for future transmission. In another alternative, all the layers are encoded each time an incoming scan block is assembled.

In the present embodiment, encoding of non-overlapping image blocks predominantly occurs in the discrete cosine transform (DCT) domain, but overlapping image blocks or the discrete wavelet transforms (DWT) may also be used. Non-transformed encoding methods such as RGB or YCrCb encoding may also be used for part or all of the data. Alternative encoding methods such as spatial sub-sampling methods may be used too. One alternative is a residual encoding method that calculates and transmits a difference value by subtracting a saved copy of the previously decoded image block. Residual encoding is a simpler technique but it is less efficient because at least two bits per pixel must be transmitted and it also requires that encoder 220 maintains a copy of the data already transmitted.

Figure 4:
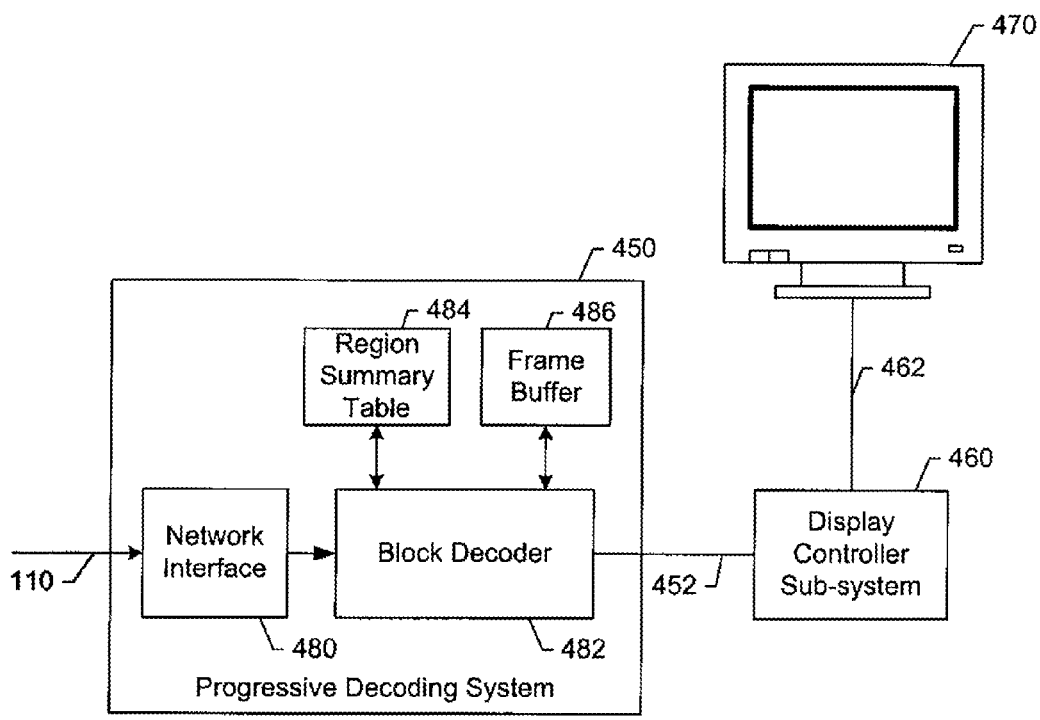
FIG. 4 shows a progressive decoding system connected to remote display via a display controller sub-system.
Figures 7, 8:
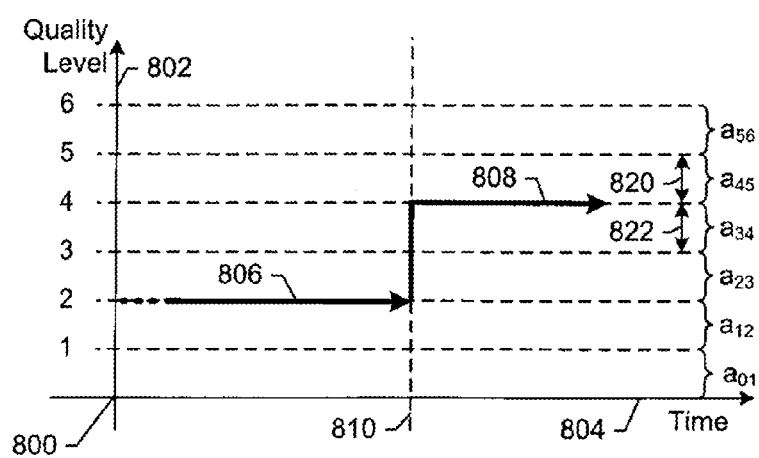
FIG. 7 presents a bandwidth analysis table with a bandwidth estimation method for the progression of a single block.
FIG. 8 shows a graph of a progression in coding quality level for a single block.

FIG. 4 shows a progressive decoding system connected to a remote display via a display controller sub-system. System 450 receives encoded progressive image data from system 108 in FIG. 1 across network 110. System 450 also receives information from system 108 including block type information, a description of which blocks are changing, target quality line information (as illustrated in FIG. 7) and encoding method in embodiments that use different encoding methods for different regions. System 450 then uses this information to decodes the encoded progressive data using similar methods used by encoder 220 in FIG. 2. System 450 maintains region summary table 484 that is synchronized with table 230 in FIG. 2.

System 450 is comprised of standard network interface 480 connected to network 110. A stream of encoded pixel blocks at different states of progressive build are forwarded from interface 480 to block decoder 482. Decoder 482 includes its own progression sequencer and build state table so it can determine the next build state for each block without a requirement for separate transmission of this information. It decodes incoming bit planes using an equivalent decoding method and engine to encoding engine 330 in FIG. 3. In one embodiment, blocks that have been encoded using an 8×8 DCT transform are decoded by decoder 482 using an inverse DCT transform on incoming encoded data. Decoded blocks are then forwarded to standard display controller sub-system 460 across bus 452. Coefficient information is then stored in frame buffer 486. When the next refinement level for a block arrives (for example, as a set of DCT coefficient refinements), the stored coefficient information is retrieved from frame buffer 486, added to the new refinement information, transformed to the image domain and forwarded to sub-system 460. In the case where an image block remains unchanged at system 108 (in FIG. 1), no pixel data is transferred across network 110 but rather decoder 482 retrieves and decodes the coefficients thereby preserving network bandwidth. In an alternative embodiment, decoder 482 also stores decoded blocks in frame buffer 486 to reduce processing in the case where a block is unchanged. Sub-system 460 generates standard display connection 462 for remote display 470. Connection 462 may be a VGA bus, a Digital Visual Interface Signal (DVI) or other standard display connection.

Figure 5:
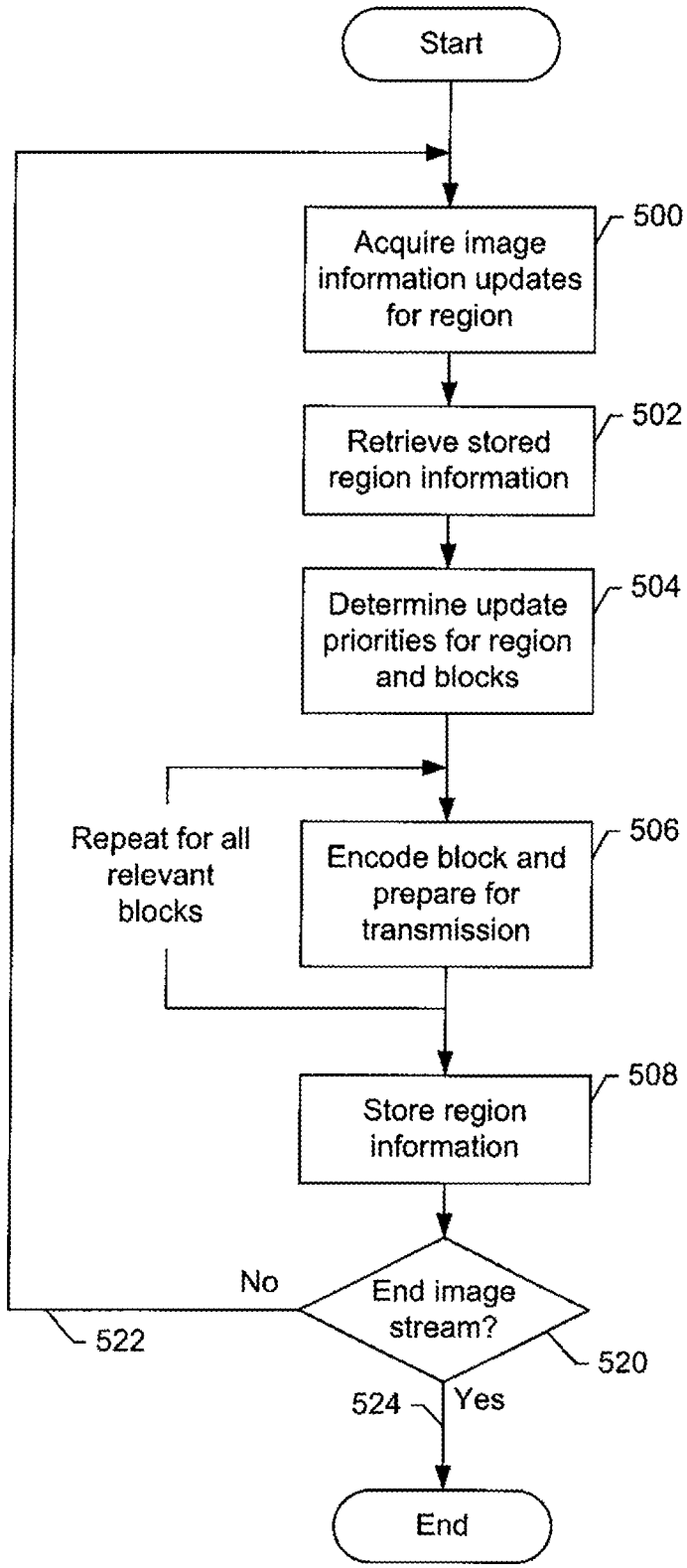
FIG. 5 shows a method that enables the progressive encoding of a computer display image stream.

FIG. 5 shows a method that enables the progressive encoding of a computer display image stream as may be executed using system 108 in FIG. 1. Changes to image content in a region are identified, analyzed and used to determine the encoding specification for the update of each block in the region. Each block identified for update is encoded to a desired coding quality level. The process is repeated for other regions of the display and for ongoing frames in the display stream.

In one embodiment, an image is encoded into a series of bit planes of increasing quality (where the increased quality could be measured using PSNR or other methods). Each encoded bit plane is directly associated with a coding quality level. The lowest quality level may include multiple bit planes necessary to provide a minimum coding quality level (identified as quality level 1 in this specification). Each additional bit plane (or set of bit planes) is associated with an increment in coding quality level. In one embodiment, the highest coding quality level is associated with all of the bit planes necessary to achieve a numerically lossless decoded image including the color space conversion. Bit planes may also be sub divided to create additional quality levels. In an embodiment where data is transformed to the frequency domain, the low frequency data may constitute one sub-plane while the high frequency data constitutes another. If the data is not transformed, groups of bit planes may be segmented along spatial boundaries to create additional quality levels. In alternative embodiments, different encoding methods may be used over different ranges of quality levels. In this case, there may not be a direct relationship between a bit plane and a coding quality level. However, a common coding quality metric can still be scaled and used to control the different encoders and identify incremental improved measurable output quality levels.

Referring to FIG. 5, image information updates for a region are acquired as a first step 500. Update information includes updated image content (referred herein as "input change") and updated image attributes including image type as described herein and illustrated in FIG. 2. Note that image information updates may be acquired in advance of a regional analysis of that region. For example, updates may be acquired for a region that is one or more regions or frames ahead of the region under analysis. This forward looking analysis allows the system to manage the bandwidth over a larger window and reserve bandwidth for large area updates that are detected ahead of the current region being processed. The forward looking analysis is a trade-off between better network bandwidth utilization and latency. The further ahead the system looks, the better the bandwidth utilization at the expense of increased image transfer latency.

As a next step 502, regional information describing the number of blocks at each coding quality level is retrieved. The present embodiment stores information using table 230 in FIG. 2. In the present embodiment, changes are managed at a block level. Any pixel change is identified as a block change and all pixels in the block are re-encoded and transmitted. The first time through the processing loop the stored region information is at an initial state. Which results in all blocks being recognized as changed during the next operation.

As a next step 504, update priorities for the region are determined based on available bandwidth and information from table 230 (in FIG. 2). An embodiment of a table 230 is presented in FIG. 6. Specific methods for determining update priorities are a major aspect of this specification and are described herein and illustrated in FIG. 9.

As a next series of steps 506, blocks that have been identified for update are encoded and prepared for transmission. In one embodiment, a changed block is first fully encoded into a set of independent bit planes containing increasing quality information. In this case, one or more additional encoded bit planes are selected for transmission. In an alternative embodiment, a block is partially encoded to a defined coding quality level and all the encoded information selected for transmission. In yet another embodiment, partial bit planes are transmitted. For example, if a discrete wavelet transform method is used, frequency sub-band information, such as HH, HL, LH or LL sub-band information may be transmitted. Preparation for transmission may include additional standard entropy, arithmetic or other encoding and packetization e.g., IP packetization for transfer across a computer network. This may be done a block or a region at a time.

As a next step 508, updated build states following the encoding process are stored for the next analysis of the same region. The present embodiment uses table 230 in FIG. 2.

As a next step 520, a process termination test is conducted. In case 522, processing is repeated for the next region of the frame. At the end of a frame the method continues by processing the top region of the next frame and updating the frame count accordingly. In case, 524, the method terminates when there is no longer a desire to transfer the image, for example in preparation for a system shutdown.

An alternative embodiment of the method is useful in situations where not all of the allocated bandwidth has been used and there is additional processing bandwidth available. The alternative method reprocesses a region where there has been no change to the input image. This enables the additional bandwidth to be used to improve the coding quality level of the image.

FIG. 6 shows an embodiment of region summary and analysis table 230 in FIG. 2. In FIG. 6, region summary and analysis table 600 includes summary section 602 which maintains a record of the number of blocks at each coding quality level and analysis section 604 which maintains bandwidth estimates on the bandwidth required to move a block from one coding quality level to another.

In the present embodiment, k0-k6 are variables that track the number of blocks for each indicated present coding quality level (as previously defined) for a total of K blocks (reference 610) in the region. Table 600 tracks 6 present quality levels and a "0" quality level on separate rows. The 0 level is used to track blocks that have undergone an input change (e.g., frame buffer update or changed input raster information for block), but no content update information has been encoded or transmitted. Alternative embodiments may use fewer or more coding quality levels to enable increased scalability in the encoded stream. In one alternative illustrated by FIG. 16, sixteen levels are used. The greater the number of levels the finer the bandwidth control. Additional bandwidth resolution may be achieved by limiting the number of blocks that transition between two levels during one update cycle.

Columns of section 604 provides estimates a00-a56 in terms of number of encoded bits for the amount of data required to move a block from any present coding quality level to a next desired quality level. A bandwidth estimate in terms of a bits/second or similar metric is easily derived by dividing the total number of encoded bits for a region by the time window allocated to transmit all the encoded bits in the region. Alternatively the desired bandwidth can be defined as the number of bits per region and the values a00-a56 can be defined as bits per block. Bandwidth analysis estimates B1-B6 (reference 612 and others shown) provide total estimates of bandwidth requirements to progress all blocks to the indicated desired coding quality level. In one embodiment illustrated in FIG. 10, all blocks are incremented to the same desired coding quality level. Other embodiments are also described herein.

Note that table 600 is a simplified table that assigns the same estimates (a00-a56) for all image types (picture, text, background video etc) and is based on an entire block change. A more complex table may include different bandwidth values for different image types and scaling factors that account for the number of pixels being encoded. One method of enabling different progressive sequences for image blocks of different types is to decompose table 600 into a series of sub-tables, each sub-table then maintains a record of the number of blocks of a defined image type (or sub-region) at each present coding quality level (kn) and bandwidth estimates for each image type (or sub-region). An embodiment with a region comprising text, pictures and background may define three sub-tables.

A second simplification applied to table 600 makes an assumption that the data required to move a block by multiple levels in a single step is the sum of data required to move the block incrementally from the lower to the higher value using multiple steps. For example, it is assumed that a total of a23+a34 bits is required to move a block from a present coding quality level of 2 to a desired coding quality level of 4. However, an alternative embodiment is possible where encoding efficiencies may reduce the data in cases of multi-level increments. In this case, table 600 may be modified to store additional estimates showing transitions between any level and any other prospective level.

In an embodiment where different encoding methods are used for different stages of an encoding progression, the estimates are adjusted to reflect the encoding efficiencies for each encoding method used. One example uses two encoding methods. A set of N−1 coding quality levels is achieved using a first transform-domain encoder. As a final step, a residual encoder is used to transform blocks from a lossy level N−1 to a lossless level N FIG. 7 and FIG. 8 provide an example that illustrates how table 600 is used to estimate bandwidth required to move a block from one level to the next.

FIG. 7 presents a bandwidth analysis table and a bandwidth estimation method for the progression of a single block. Bandwidth analysis table 700 is an abbreviated form of region summary and analysis table 600 in FIG. 6. Data such as k0-k6 in section 602 of table 600 in FIG. 6 is assumed to be available. The progression of a single block is shown to illustrate an estimation of bandwidth in a simplified progression. Arrow 702 shows the progression of a block from a present coding quality level of 2 (reference column 704) to a desired coding quality of 4 (reference column 706) where a vertical line 708 through column 706 represents a simple embodiment of a target quality line. A bandwidth estimate for the described block is a23+a34. In the case of a total of k2 blocks (reference FIG. 6) starting at coding quality level 2 and ending at a coding quality level of 4, the total bandwidth estimate bwtotal is calculated as $$\text{bwtotal} = k2 \times (a23 + a34) \quad (1)$$

In an alternative embodiment where a region has different image types and table 700 is comprised of a sub-table supporting each image type, each sub-table may have an independent target quality line.

FIG. 8 presents graph 800 that plots coding quality level on vertical axis 802 against time on horizontal axis 804. Graph 800 shows the increase in coding quality level for a block subjected to the progression described herein and illustrated in FIG. 7.

At time 810, the described block progresses from a present coding quality level 2 (reference 806) to desired coding quality level 4 (reference 808). It is worth noting that vertical quality level axis 802 shows equal measured quality level increments for each of the defined coding values shown. However, the bandwidth required to move a block from one level to the next increases as the measured quality level increases. For example a45 (reference 820)>a34 (reference 822) in FIG. 8. In fact, an increase of 2× per bit plane may be found in a representative embodiment. It is this non-linear increase in bandwidth requirement that prevents the use of a simple formula for incrementing all blocks towards a lossless state at the same rate and forms the basis for the more sophisticated progression priority schemes introduced in FIG. 9.

Figure 9:
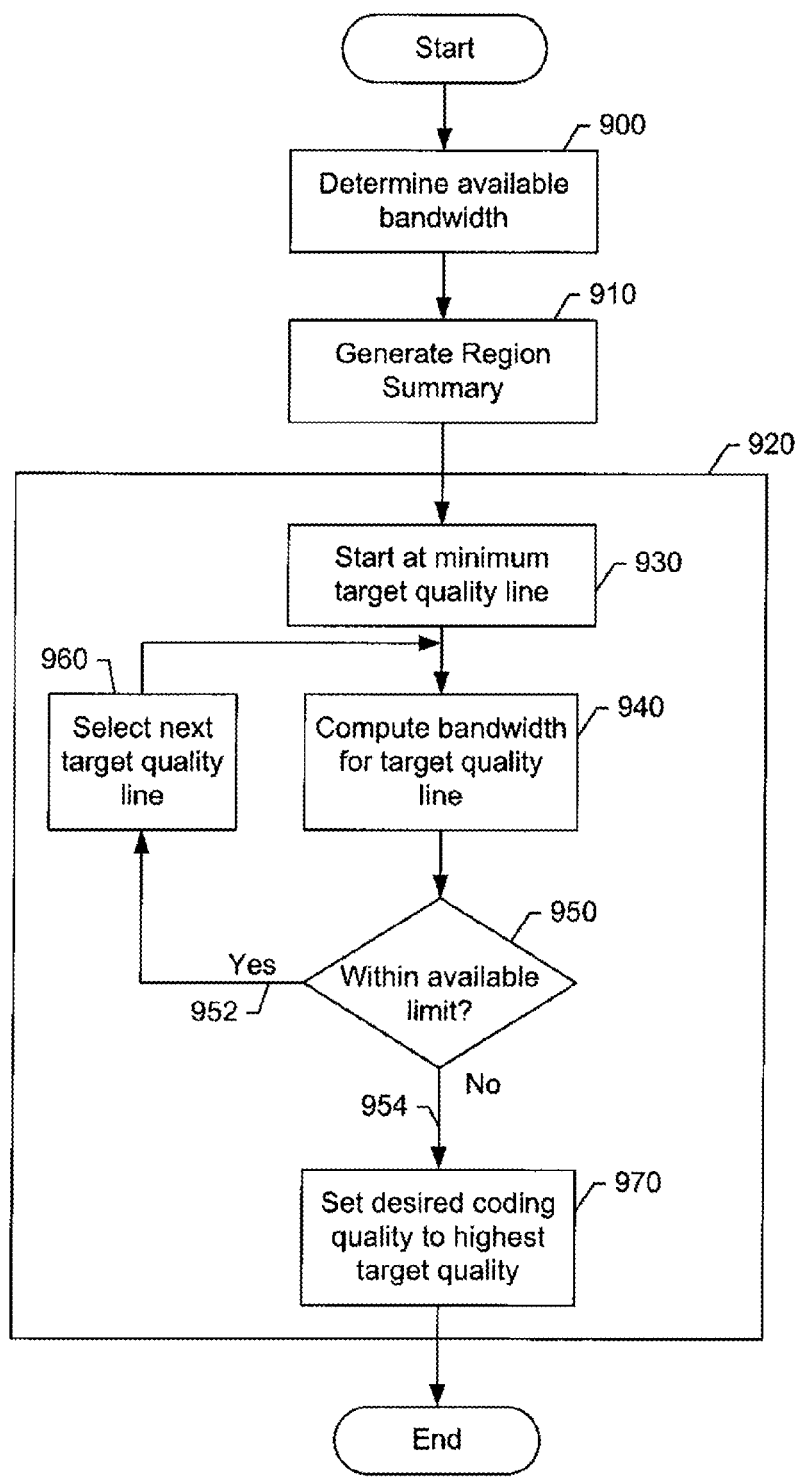
FIG. 9 shows a method for determining update priorities for a region.

FIG. 9 shows an embodiment of step 504 in FIG. 5 for determining update priorities for a region. In a simple embodiment, update priorities for a region are determined by the state of the current region as described by a region summary and analysis table such as table 600 in FIG. 6 using fixed available bandwidth constraints. In more sophisticated embodiments, update priorities are also influenced by bandwidth forecasts, the state of other regions, and decoder or network error conditions which override the progressive encoding sequence by forcing retransmission or transmission of initial update information.

Referring to FIG. 9, the available bandwidth for a region is determined as a first step 900. In one embodiment, a fixed available bandwidth for a frame is evenly distributed across the regions comprising the frame. In an alternative embodiment, one or more regions demanding a high bandwidth (e.g., a video sequence as determined by hints from the application software or change patterns at a block level) are allocated additional bandwidth at the expense of less dynamic regions. In another embodiment, traffic shaping methods are used to spread the bandwidth fairly over different regions.

As a next step 910, a regional summary is generated so that progressive build requirements may be determined based on the regions most recent change information. In the present embodiment, table 600 is updated such that blocks that have changed are reset to a present coding quality level of 0 (entry "k0" in column 602 of table 600 in FIG. 6). In an embodiment that enables a dynamic selection between different target quality line styles as described by the different target quality line embodiments below, step 910 may include the selection of a style of target quality line based on available bandwidth or region summary. In an alternative embodiment, an initial style is selected for each identified image type but is subject to change based on a bandwidth analysis (step 940 below). In an embodiment where step 500 identifies blocks as being of video type, one or more target quality lines may be selected during that step.

As a next series of steps 920, the desired coding quality level for the blocks in the region is determined. Several embodiments using different target quality lines are illustrated by later figures below. In an embodiment supporting multiple target quality lines associated with different image types or independent sub-regions of the same type but with different target quality lines, steps 920 are repeated for each areas target quality line represented.

A minimum target quality line is selected as step 930. There are many possible methods for selecting a minimum target quality line. In one embodiment, historic estimates are used to determine the starting point for a new estimation. In another embodiment, a current block distribution is used as a starting point for a first estimate. The bandwidth required to meet the target quality is calculated as next step 940. Different embodiments use different formulae as described below.

As next step 950, a check is performed to test if the required bandwidth is within the available bandwidth. In case 952, bandwidth is available so a higher target quality line is selected as step 960 and step 940 is repeated using the higher target. In case 954, the required bandwidth exceeds the available bandwidth so the desired coding quality is set to the previous (lower) target quality line as final step 970.

Figure 16:
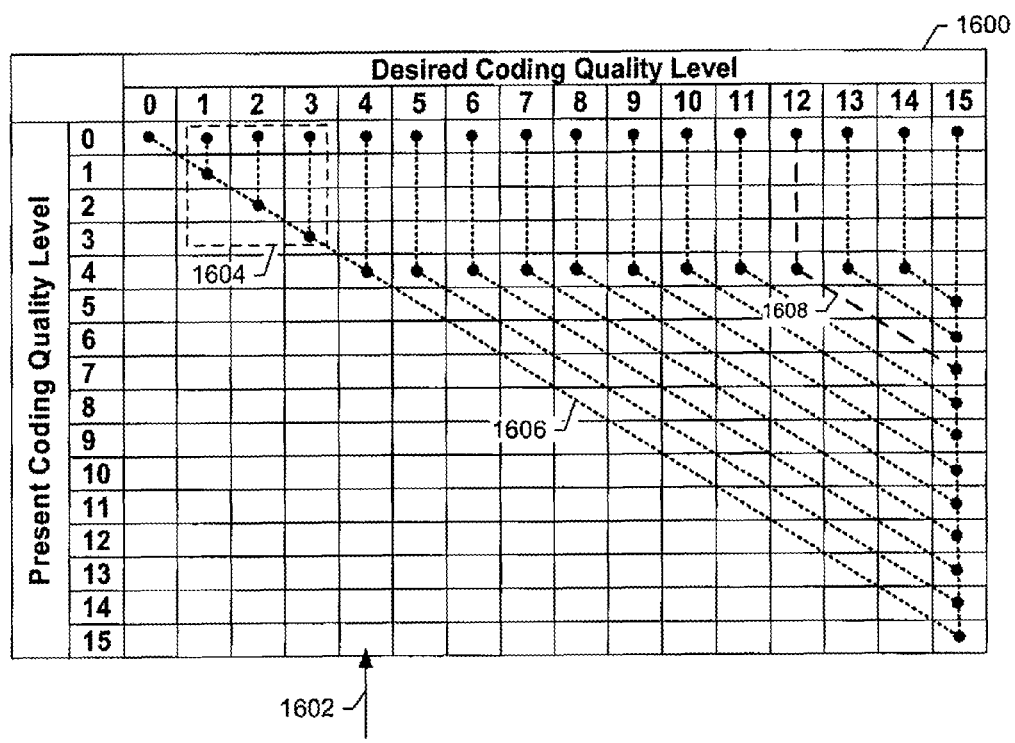
FIG. 16 presents a bandwidth analysis table and method for progressing the coding quality of blocks such that the progression of low quality blocks to a baseline threshold quality level is prioritized.
Figure 19:
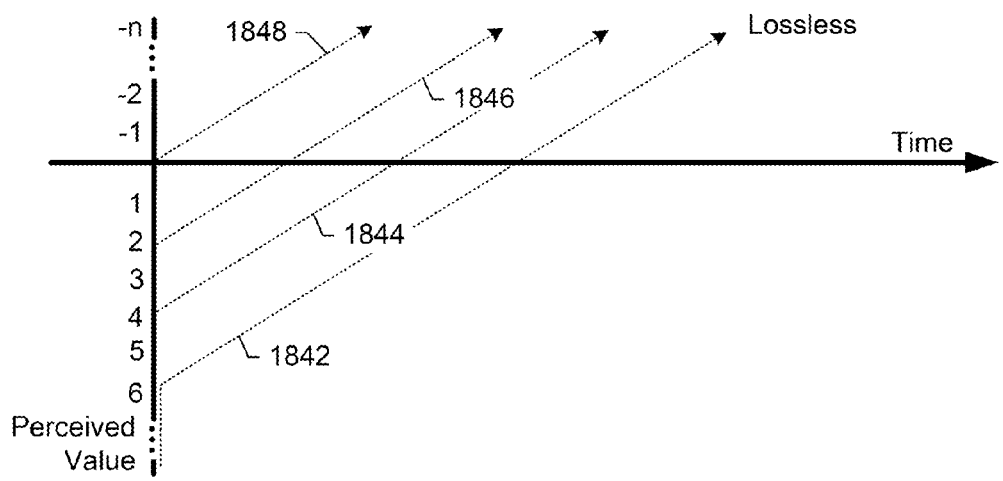
FIG. 19 shows a plot of perceived quality over time for an embodiment where it is acceptable to experience a high quality image that is obsolete even when the input has changed.

FIG. 10 and FIG. 11 describe an embodiment that loops through step 920 using target quality lines that bring changed blocks to the same desired coding quality level. FIG. 12 and FIG. 13 describe an embodiment that loops through step 920 using target quality lines that increments changed blocks by the same coding quality increment. FIG. 14 and FIG. 15 describe an embodiment that loops through step 920 and more recent updates are prioritized by assigning them proportionally larger increments. FIG. 16 and FIG. 17 describe an embodiment that loops through step 920 and recent updates are prioritized by establishing a baseline quality threshold used for all blocks ahead of improving the quality level of blocks over the threshold. In FIG. 19, blocks are incremented at different rates, dependent on current perceived quality levels. Other embodiments are also possible.

FIG. 10 presents a bandwidth analysis table and method for progressing the coding quality of a region by moving all changed blocks to a same desired coding quality level. Bandwidth analysis table 1000 is an abbreviated form of table 600 in FIG. 6. Data such as k0-k6 in section 602 of table 600 in FIG. 6 is assumed to be available. In the present embodiment, a pre-determined available bandwidth value is assumed. This may be a constant value or a variable value provided in advance by an independent processing method.

Total data and associated bandwidth requirements are determined for each desired coding quality level, indicated by target quality lines 1010, 1012, 1014, 1016, 1018 and 1020 shown. Zero bandwidth line 1030 represents a baseline target where no blocks are updated and consequently no bandwidth is consumed. A highest target quality line within the available bandwidth is then selected using the method described by step 920 in FIG. 9 and all blocks in the region below the target are encoded to the selected target quality line. All blocks at the target or above the target remain unchanged. Table 1 presents a set of equations used by this embodiment in step 940 (ref. FIG. 9) for calculating bandwidth requirements for target quality lines at different desired coding quality levels.

TABLE 1

Bandwidth Estimation for Blocks Increased to Same Coding Quality

| Desired Coding Quality Level | FIG. 10 Target Quality Line Reference | Estimated Bandwidth Requirement |
|---|---|---|
| 0 | 1030 | 0 |
| 1 | 1010 | $bw_{01} = k_0 \times a_{01}$ |
| 2 | 1012 | $bw_{02} = bw_{01} + (k_0 + k_1) \times a_{12}$ |
| 3 | 1014 | $bw_{03} = bw_{02} + (k_0 + k_1 + k_2) \times a_{23}$ |
| 4 | 1016 | $bw_{04} = bw_{03} + (k_0 + k_1 + k_2 + k_3) \times a_{34}$ |
| 5 | 1018 | $bw_{05} = bw_{04} + (k_0 + k_1 + k_2 + k_3 + k_4) \times a_{45}$ |
| 6 | 1020 | $bw_{05} = bw_{05} + (k_0 + k_1 + k_2 + k_3 + k_4 + k_5) \times a_{56}$ |

FIG. 11 shows three consecutive progression states in a region where all blocks are increased to a same coding quality level. The example uses initial assumptions that blocks in the region are at initial progression state 1100 with initial present coding quality levels as indicated by the values associated with each block. Under the illustrative constrains of the example, the available bandwidth (bwregion) for the region is $$bw04 <= bwregion < bw05 \qquad (2)$$

where bw04 and bw05 are previously defined in Table 1.

In the example, area 1102 is subjected to an input change. The changed blocks are therefore assigned a present coding quality level of 0 as shown in progression state 1110. Note that no updates have been encoded or transmitted at this time. In the example, the other blocks in the region remain unchanged. Ideally, changed area 1102 is immediately updated to a coding quality level of 6 in a single step corresponding with an ideal desired coding quality for area 1102. However, due to the available bandwidth limitations imposed by equation (2), the highest target quality line within the limit is bw04 (reference target quality line 1018 in FIG. 10). Therefore a first update using a desired coding quality value of 4 for changed area 1102 and other partially progressed blocks is chosen as shown in progression state 1120.

The described example illustrates a simple method whereby all blocks are updated to a same desired coding quality level. In a practical application, each region is subjected to multiple changes at different times and alternative prioritization methods, such as those introduced below, are useful in ensuring that blocks at a low coding quality are updated while blocks at higher coding quality levels do not stagnate in a partially encoded state due to insufficient bandwidth.

FIG. 12 presents a bandwidth analysis table and method for progressing the coding quality of a region by updating all changed blocks by the same increment. One method of ensuring that blocks at higher coding quality levels do not stagnate in a lossy progression state is to increment all changed blocks by the same increment, independent of their present coding quality levels.

Bandwidth analysis table 1200 is an abbreviated form of table 600 in FIG. 6. Data such as k0-k6 in section 602 of table 600 in FIG. 6 is assumed to be available as before. Total data requirements are determined for each desired coding quality level, indicated by target quality lines 1202, 1204, 1206, 1208, 1210 and 1212 shown in bandwidth analysis table 1200 of FIG. 12. As before, zero bandwidth line 1220 represents a baseline target where no blocks are updated and consequently no bandwidth is consumed. The highest target quality line within the available bandwidth is then selected and all blocks in the region below the target quality line are encoded to the selected target quality line. All blocks at the target or above the target remain unchanged. Note that the target lines turn and run vertically downwards at the maximum quality column to prevent the constant increment from setting any quality levels above maximum coding quality level 6 (e.g., For target quality line 1204, blocks at present coding quality level 5 (reference k5 in FIG. 6) increase to desired coding quality level 6).

Table 2 presents a set of equations used by this embodiment in step 940 (ref. FIG. 9) for the calculation of estimate values for a set of target quality lines, a selection of which are shown in FIG. 12.

TABLE 2

Bandwidth Estimation for Blocks Increased by Same Increment

| Quality Increment | FIG. 12 Reference | Estimated Bandwidth Requirement |
| --- | --- | --- |
| 0 | 1220 | 0 |
| 1 | 1202 | $ibw_1 = (k_0 \times a_{01}) + (k_1 \times a_{12}) + (k_2 \times a_{23}) + (k_3 \times a_{34}) + (k_4 \times a_{45}) + (k_5 \times a_{56})$ |
| 2 | 1204 | $ibw_2 = ibw_1 + (k_0 \times a_{12}) + (k_1 \times a_{23}) + (k_2 \times a_{34}) + (k_3 \times a_{45}) + (k_4 \times a_{56})$ |
| 3 | 1206 | $ibw_3 = ibw_2 + (k_0 \times a_{23}) + (k_1 \times a_{34}) + (k_2 \times a_{45}) + (k_3 \times a_{56})$ |
| 4 | 1208 | $ibw_4 = ibw_3 + (k_0 \times a_{34}) + (k_1 \times a_{45}) + (k_2 \times a_{56})$ |
| 5 | 1210 | $ibw_5 = ibw_4 + (k_0 \times a_{45}) + (k_1 \times a_{56})$ |
| 6 | 1212 | $ibw_6 = ibw_5 + (k_0 \times a_{56})$ |

A progression example for a region using the target quality lines of FIG. 12 is shown in FIG. 13. FIG. 13 illustrates a progression for a region of 4×4 blocks using a same coding quality increment for all changed blocks. FIG. 13 shows six consecutive states of progression in a region where all blocks are increased using the same coding quality increment. A simplified example case using an increment of 1 coding quality level for all updates has been chosen. In a practical application, the highest possible increment within the available bandwidth is selected for each update (using bandwidth estimation formulae in Table 2), taking the number of blocks at each coding quality level into consideration.

The example assumes initial progression state 1300 with all blocks in the region at maximum present coding quality level 6. In the example, area 1302 shown is subjected to an input change. The changed blocks are therefore assigned a present coding quality level of 0 as shown in progression state 1310. In the example, the other blocks in the region remain unchanged.

The constraints imposed by the example dictate a desired coding quality increment of 1 for change area 1302 for a first update. Therefore changed blocks progress to a coding quality level of 1 in a first update step as shown in progression state 1320. Progression state 1330 shows different area 1304 subjected to a second input change and set to a present coding quality level of 0. A desired coding quality increment of 1 for the change areas 1302 and 1304 is once again chosen per constraints of the example. All changed blocks progress by a single coding quality increment in a second update step as shown in progression state 1340. Progression state 1350 shows a third time the region is updated but where no input changes are present. In the third update step all the changed blocks that have not reached final coding quality level 6 are incremented again. The sequence is assumed to continue until all blocks once again reach a present coding quality level of 6 or additional input changes trigger additional progressions.

The described example illustrates a simple method whereby all blocks are incremented at the same rate. Given sufficient bandwidth availability, this results in a perceptually constant update rate for all changed regions of an image. However, in many applications, perceptual quality of a display is improved by providing a higher coding priority to blocks at a lower present coding quality levels. This may be accomplished using various strategies, two of which are detailed below.

FIG. 14 presents a bandwidth analysis table and method for progressing the coding quality of blocks using a proportional coding quality increment. One problem with incrementing all blocks by the same rate is that blocks at higher coding quality levels require a significant proportion of the available bandwidth for a low additional improvement in perceptual quality. At the same time, this prevents the rapid progression of blocks at a low perceptual quality. Some of this bandwidth may be more effectively utilized by allocating it to blocks at a low coding quality. In most instances, a progression from a low quality level to a medium coding quality level has higher perceptual value than an incremental improvement between two higher coding quality levels.

Bandwidth analysis table 1400 is an abbreviated form of table 600 in FIG. 6. Data such as k0-k6 in section 602 of table 600 in FIG. 6 is assumed to be available as before. The bandwidth is estimated for target quality lines 1402, 1404, 1406, 1408 and others implied. Target quality lines converge at point 1404 as shown. As before, zero bandwidth line 1420 represents a baseline target where no blocks are updated. The highest target quality line within the available bandwidth is then selected as before. All blocks in the region below the target are encoded to the selected target quality line. All blocks at the target or above the target remain unchanged. Note that in the present embodiment, the encoder operates to integer quality levels and therefore the lines are rounded to the closest desired integer quality level for each present coding quality level. A progression example for a region using the target quality lines of FIG. 14 is shown in FIG. 15.

FIG. 15 illustrates a progression for a region of 4×4 blocks using a proportional coding quality increment. FIG. 15 shows six consecutive states of a progression in a region where all blocks are increased using a proportional coding quality increment. For illustration purposes, a simple 3>2>1 increment sequence for all updates is used in this example to move blocks from an initial coding quality level of 0 to a final coding quality level of 6 (i.e., Changed blocks are first move to quality 3 on a first update, then to quality 5 on a second update and finally to quality 6 on a third update (3>2>1)). In a practical application, the fastest possible increment sequence within the available bandwidth is selected for each update, taking the number of blocks at each coding quality level into consideration as before.

The present embodiment uses an initial assumption that all blocks in the region are at an initial maximum present coding quality level of 6 as shown in progression state 1500. In the example, area 1502 shown is subjected to an input change. The changed blocks are therefore assigned a present coding quality level of 0 as shown for next progression state 1510. In the example, the other blocks in the region remain unchanged.

The target quality line for a first update (approximated by line 1402 in FIG. 14) translates to a desired coding quality increment of 3 for change area 1502 per constraints of the example. The changed blocks progress to a coding quality level of 3 in a first update step as shown in progression state 1520. In the example, a different area 1504 of the region is subjected to an input change and set to a present coding quality level of 0 shown in next progression state 1530. In a second update step shown (the target line is still approximated by line 1402 in FIG. 14) as progression state 1540, change area 1504 is incremented by 3 levels while change area 1502 is only incremented by 2 levels. Final progression state 1550 shows a third update step where the changed blocks are incremented again. Change area 1504 is incremented by 2 levels while change area 1502 is incremented by a single level. The sequence is assumed to continue until all blocks once again reach a present coding quality level of 6 or additional input changes trigger additional progressions.

FIG. 16 presents a bandwidth analysis table and method for progressing the coding quality of blocks such that the progression of low quality blocks to a baseline threshold quality level is prioritized. While incremental increases in coding quality levels at the lower end of the perceptual quality spectrum offer measurable quality improvements, image content may remain perceptually unintelligible or unacceptable below a baseline coding quality threshold. This limitation is particularly pertinent to applications such as computer display images where text and icons may have very fine resolutions. In such applications, it becomes important to prioritize the progression of changed input blocks to a baseline coding quality level that is perceptually significant over the improvement of blocks that have already reached the threshold. FIG. 16 describes a method of prioritizing the progression of blocks below a baseline coding quality threshold. Bandwidth analysis table 1600 in FIG. 16 is similar to previously shown bandwidth analysis tables with the exception that the number of significant coding quality levels is increased to 15. The introduction of a higher resolution system offers finer scalability over coding quality and more efficient use of available bandwidth.

Rather than constructing linear target quality lines as previously described, the lines shown in the present embodiment are segmented such that baseline coding quality threshold 1602 is established at a desired coding quality level of 4. In alternative embodiments, other baseline threshold values may be used to meet the perceptual quality requirements of the system. In other alternative embodiments the baseline may be variable, allowing a trade-off between latency and quality such that over a low bandwidth connection, the low quality baseline may be more acceptable then the additional latency required to get to a higher quality.

The present embodiment shows up to three segments for each target quality line. For example, identified target quality line 1608 is comprised of a first vertical segment that move blocks of present coding quality 0-4 to a desired coding quality of 12, followed by a second segment that increments blocks with a present coding of 5-7 in a proportional manner similar to that described by FIG. 14. Lastly, a third vertical segment moves all blocks with a present coding quality of 8-14 to a final coding quality level 15. In alternative embodiments, each target quality line may be constructed of multiple segments. Other alternative embodiments may combine lossy and lossless coding methods such that a series of constructed target quality lines is used to enable the progression of a block to a maximum lossy coding quality level. Thereafter, a state machine or other appropriate method is used to enable the progression of the block to a lossless coded quality level.

FIG. 16 shows insufficient bandwidth quality lines in area 1604 where there is not sufficient bandwidth to encode changed blocks to a minimum desired coding quality threshold 1602. In this case, changed blocks may only be progressed to desired coding quality levels 1, 2 or 3. Furthermore, unchanged blocks would not be improved in this scenario. On the next frame these blocks receive equal priority to newly changed blocks in the progression to coding quality threshold 1602.

Bandwidth requirements for the target quality lines shown is estimated using the described methods. As before, zero bandwidth line 1606 represents a baseline target where no blocks are updated. The highest target quality line within the available bandwidth is then selected as before. All blocks in the region below the target are encoded to the selected target quality line. All blocks at (or above) the target remain unchanged. The consequence of the segmented target quality lines is that blocks in the region with a coding quality level below the baseline quality threshold are moved to the threshold before any blocks are advanced beyond the threshold.

A progression example for a region using the target quality lines of FIG. 16 is shown in FIG. 17. FIG. 17 illustrates a progression for a region of 4×4 blocks using a proportional coding quality increment. FIG. 17 shows eight consecutive states of a progression in a region where all blocks below baseline coding quality threshold 1602 (reference FIG. 16) are prioritized over blocks that have reached threshold 1602.

For illustration purposes, a simple 4>1>1>1 increment sequence for all updates is used in this example to move blocks from an initial coding quality level of 0 to a final coding quality level of 15. In a practical application, the highest possible increment within the available bandwidth is selected for each update, taking the number of blocks at each coding quality level into consideration as before.

All blocks in the region are assumed to be at an initial maximum present coding quality level of 15 as shown in progression state 1700. Area 1702 is subjected to an input change and the changed blocks are assigned a present coding quality level of 0 shown in progression state 1710. In the example, the other blocks in the region remain unchanged.

The target quality line for the first update translates to a desired coding quality increment of 4 for the change area 1702 (once again per sequence constraints of the example) and the changed blocks progress to a coding quality level of 4 in a first update step shown as progression state 1720.

This is followed by progression states 1730 and 1740 corresponding to second and third update steps in which the changed blocks incrementally progress to a coding quality level of 5 an then level 6. Progression state 1750 shows a different area 1704 of the region subjected to an input change and set to a present coding quality level of 0 followed by progression state 1760 after a forth update step where change area 1704 is incremented by 4 levels. However, unlike previous examples, change area 1702 is not incremented but remains at a present coding quality level of 6. This step illustrates the prioritization of the progression of area 1704 to a baseline threshold over the additional progression of area 1702. Finally, progression state 1770 shows the results of a fifth update step where all the changed blocks are incremented by a single level again. Change area 1704 is incremented by 1 to level 5 while blocks exclusive to change area 1702 are incremented to level 7. The sequence is assumed to continue until all blocks once again reach a present coding quality level of 15 or additional input changes trigger additional progressions.

Figure 18:
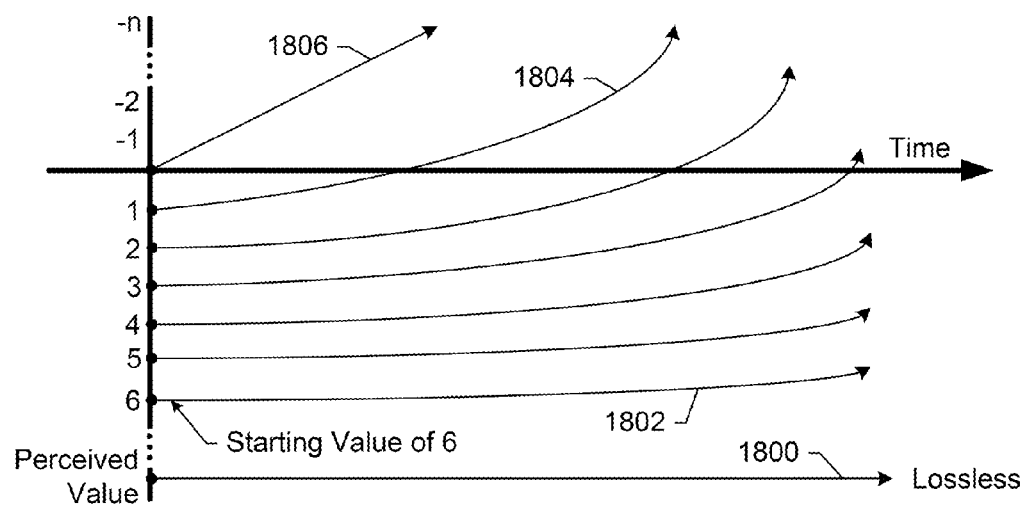
FIG. 18 shows a plot of perceived value of an obsolete image over time.

FIG. 18 is a graph illustrating the decline in perceived image quality over time for blocks that have not reached a lossless state. The bandwidth analysis tables and related block progression sequences described above operate according to measurable present and desired coding quality levels. In practice, image quality levels as perceived by the human brain have a temporal dependency. This aspect of the present invention modifies the bandwidth analysis table to compensate for the temporal dependency of perceived quality levels. Note that the present invention uses the term "perceived value" to refer to a human perceived quality level compared with "coding quality level" used to refer to a quality level that is measurable using PSNR or other means.

FIG. 18 shows a plot of perceived value over time. Lossless perceived value 1800 remains constant over time as shown while lower perceived values typically decline at increasing rates. This may be seen in FIG. 19 by comparing plot 1802 with a starting perceived value of 6 and slowly declining compared to plot 1804 with a starting perceived value of 1 and rapidly declining. Values starting at 0 and declining in the negative domain (reference perceived quality line 1806) represent the perceived quality of image content that has not been updated at all and therefore the displayed content is obsolete and inaccurate.

Note that the slope of the curves on the graph, especially in the negative perceptual value domain are dependent on the perceptual nature of the application. In one case, it may be both pleasing to the human brain and functionally acceptable to experience a high quality image that is obsolete because the input has changed. A sequence of photographs is one specific example where this may be true. In this case, the perceptual value of obsolete image content remains relatively high over time. Note that the actual period of time that content is "obsolete" using the present invention is usually less than 1 second and more typically less than 100 ms. In another case more typical of a computer display environment, while visually less appealing, it is more important to replace obsolete content with updated content, even if the updated content is presented at a lower quality level. A simple example is a stock trader monitoring real-time trading data. In this case, the perceptual value of obsolete declines very quickly over time. Initial perceived values immediately following an update may be directly correlated with present coding quality levels previously discussed. This direct relationship between a coding quality level and a time-dependent perceived value enables the temporal compensation of block progression based on mapping of compensated quality levels into a bandwidth analysis table as described by FIG. 16.

FIG. 19 shows a plot of perceived quality over time for an embodiment where it is acceptable to experience a high quality image that is obsolete even when the input has changed. In FIG. 19, line 1806 of FIG. 18 is replaced with lines 1842, 1844, 1846 and 1848 to remove the limitation in FIG. 18 that obsolete data starts at a perceived quality of 0. Plot 1842 shows a block at lossless perceived quality at time 0 when the input image changes. The perceived value drops to an initial positive value and then deteriorates over time. FIG. 19 shows that it may be more important to improve a poorly coded image then it is to start sending updates for an obsolete but lossless image.

Figure 20:
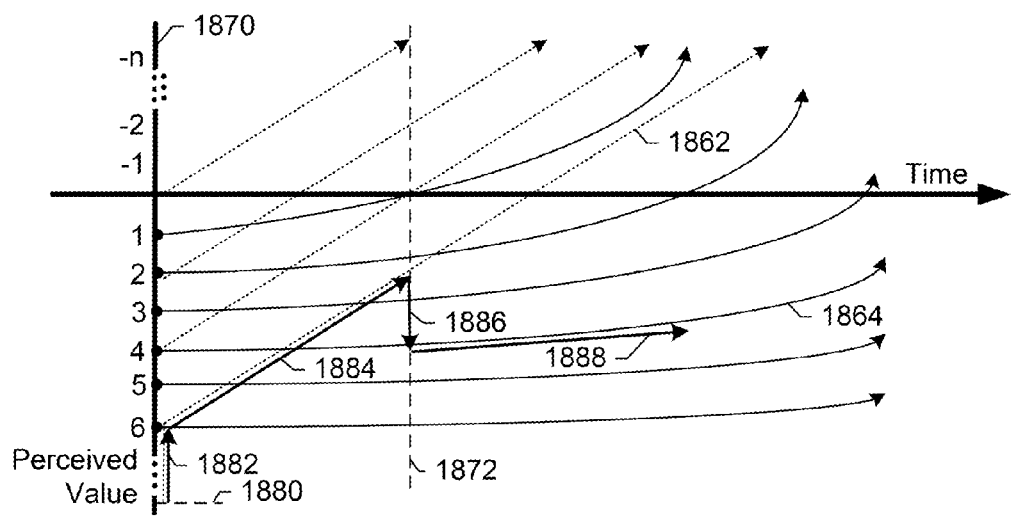
FIG. 20 shows an embodiment where an obsolete lossless image block is delayed before it is replaced with a changed input image block.

FIG. 20 shows an embodiment where an obsolete lossless image block is delayed before it is replaced with a changed input image block and plots a progression in perceived value from time 1870 for a block at lossless perceived quality 1880 when the input changes. As a first stage 1882 in the progression after the input changes, the block drops to a new perceived quality. In fact, the viewer may not perceive the obsolete status of the block at this time. As a next stage in the progression 1884, the perceived quality follows curve 1862 until time 1872. At time 1872, it is determined that it more valuable to use available bandwidth to encode the new content to perceived value of 4 than to allow further deterioration of the obsolete image. The changed input is encoded to a perceived value of 4 as stage 1886 shown. Finally, the changed input deteriorates as predicted by curve 1864 during stage 1888. Stage 1888 lasts until either the content is improved or a new changed input is encoded.

Figure 21:
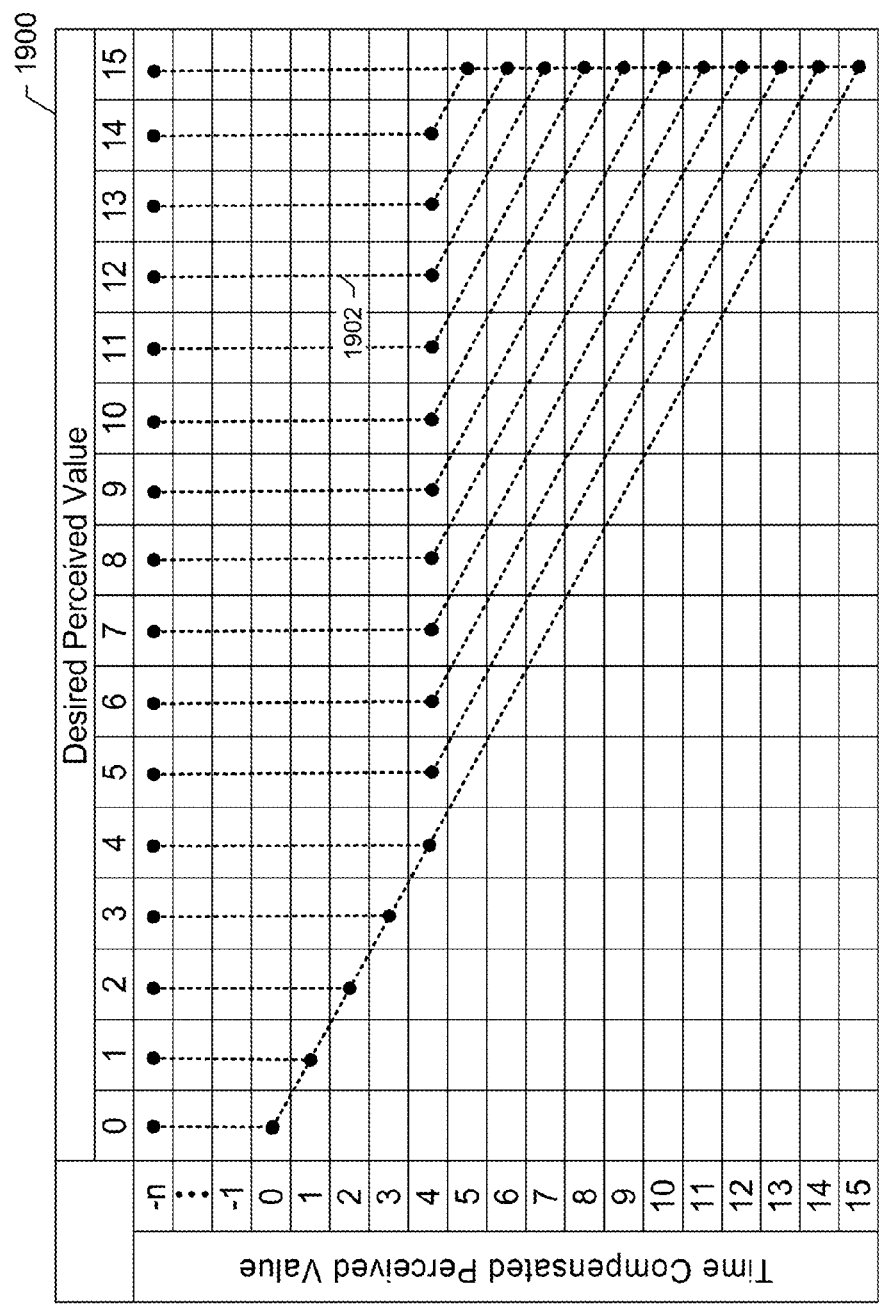
FIG. 21 shows a bandwidth analysis table with perceived value compensation.

FIG. 21 shows a bandwidth analysis table with perceived value compensation. A method for compensating for time dependent perceived quality is described by a variation on the method described by FIG. 5 in which step 500 includes a recording of the time (for example, in number of frames) each block remains at a build state and step 504 uses bandwidth analysis table 1900 in FIG. 21 as described below. Table 1900 enables the progression of blocks in a manner similar to the method used by table 1600 in FIG. 16. However, a perceived value compensation graph translates quality levels between a measurable coding quality domain as used in earlier embodiments of the present invention and a time-dependent perceived value domain used by table 1900. Target quality line 1902 in table 1900 is similar to target quality line 1608 described for FIG. 16, comprising three segments. However, the first vertical segment extends to an nth negative perceived quality value corresponding with an nth negative perceived quality value for the graph shown in FIG. 21.

State information including present coding quality level and time since last update is maintained for each block (as captured in step 500 in FIG. 5). During region analysis (step 504 in FIG. 5), a perceived value compensation table is used to retrieve an equivalent perceived value for each block in the region. In the present embodiment, a look-up table derived from the graph in FIG. 21 is used. In other embodiments, different perceptual value trends are used, each trend pertinent to the specific application of the embodiment. Translation between domains occurs as follows. As a first step, bandwidth estimates for target quality lines are calculated as described by step 940 in FIG. 9 and a desired perceived quality level for each block is determined. As a next step, a next coding level for each block is determined by mapping the perceived values back to real desired coding quality levels using a reverse table look up procedure. Note that perceived quality levels in FIG. 21 need to be quantized to integer perceived quality levels in embodiments where an encoder only supports integer coding quality levels.

The description above discloses a system and methods for prioritizing the progressive transfer of blocks based on regional priorities as determined using bandwidth analysis tables. These methods are useful for controlling the bandwidth of remote computer display applications and enabling prioritization of different content types; for example a high priority content changes such as a text image area update is readily prioritized over the final build stages of a picture area in the same region. Bandwidth analysis may also be combined with motion detection methods to control the bandwidth necessary to update positional changes in constant content, as might occur when a window is scrolled or dragged. Once again, the progressive build of high priority subjects to high quality levels may be prioritized over lower priority subjects once the image has become constant.

In an environment that communicates video sequences to a remote system, further improvements in a user's perceptual experience may be gained using the progression methods described below. These specifically identify image blocks of a video type so that video content may be treated using different bandwidth analysis methods to other image types in a region.

Figure 22:
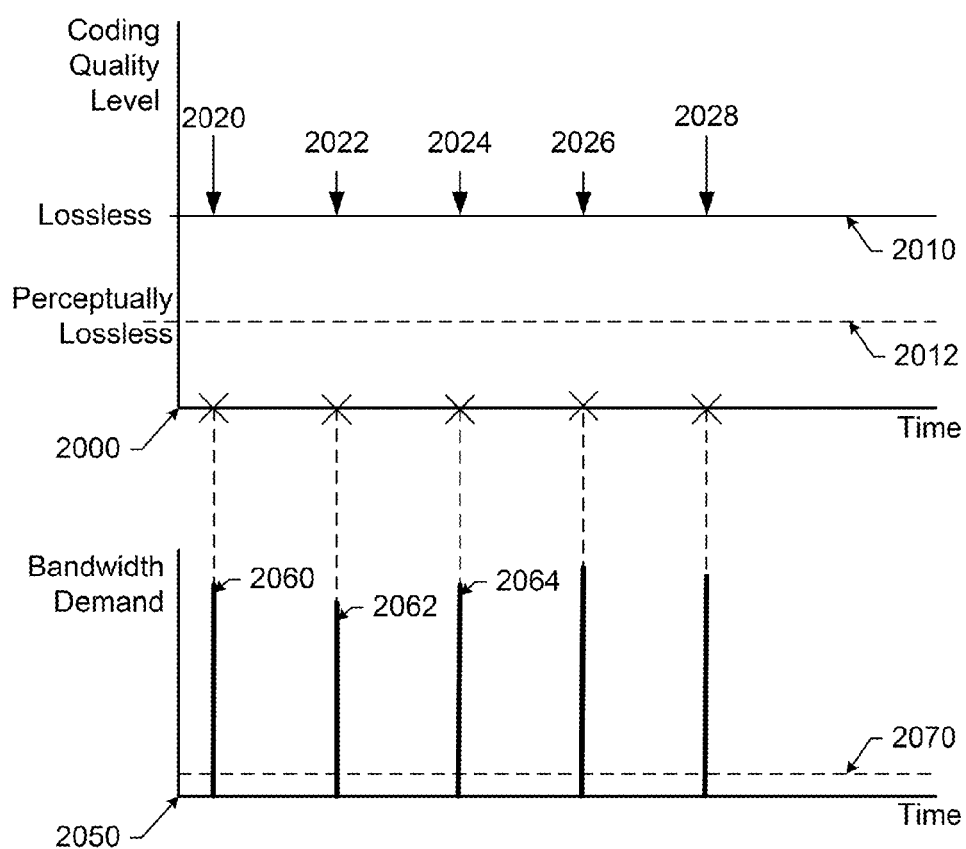
FIG. 22 is prior art diagram that illustrates the bandwidth demand for the transfer of a lossless video sequence.

FIG. 22 is a prior art graphical representation describing a practical limitation associated with the communication of raster graphics sequences across a network. Unlike synthetic computer display images, rasterized video sequences are characterized by large areas of content change on every video frame update. In fact, a fractional lighting change caused by camera motion will likely change the pixel value associated with the digitized representation of a perceptually static scene. Upper graph 2000 in FIG. 22 shows a plot of lossless coding quality level 2010 of a video display sequence that starts at time 2020 and ends at time 2028, with periodic frame updates at times 2022, 2024, 2026 and 2028 as shown. Note that the term "lossless" as used in this specification refers to a coding quality level that may be lossless in a binary sense or some other perceptually lossless final coding quality level. While 30 frames per second is a commonly used frame rate, other rates are also possible. Lower graph 2050 shows the network bandwidth demand required to achieve a lossless display over the same period of time. Due to the large content changes, high levels of instantaneous bandwidth 2060, 2062, 2064 and others shown are required to communicate the data. In a practical application, data transmission may be distributed over a full 33 mS frame period but even then a lossless update far exceeds link capacity level 2070 offered by typical existing transmission systems such as corporate LANs or last mile connections. While the bandwidth demands of rasterized video content presents one problem, a related problem arises in the prioritization of other high priority information and trade-off in perceptual quality between different image types. For example, a foreground text editor on a computer display may be of higher interest and warrant higher display quality than a background video insert.

A solution to these problems lies in the positive identification of video sequences and the application of bandwidth management strategies that preserve bandwidth for other applications while also maximizing the perceptual quality of the video content. Methods for applying the regional analysis methods described herein and illustrated in FIG. 5 to support bandwidth management in a region containing one or more areas of video are discussed below.

The methods described are of particular relevance to remote display or other applications where the frame rate for the image content is lower than the display refresh rate. An example of such an application is a video sequence with a 30 fps content frame rate that is displayed on a CRT computer monitor with an 85 frame per second CRT refresh rate. In applications where the frame rate for the image content matches the refresh rate (for example, a 30 fps TV signal matching a 30 fps display refresh rate), the encoding methods described may still be applied without interfering with natural image motion although the same quality may not be achieved.

Figure 23:
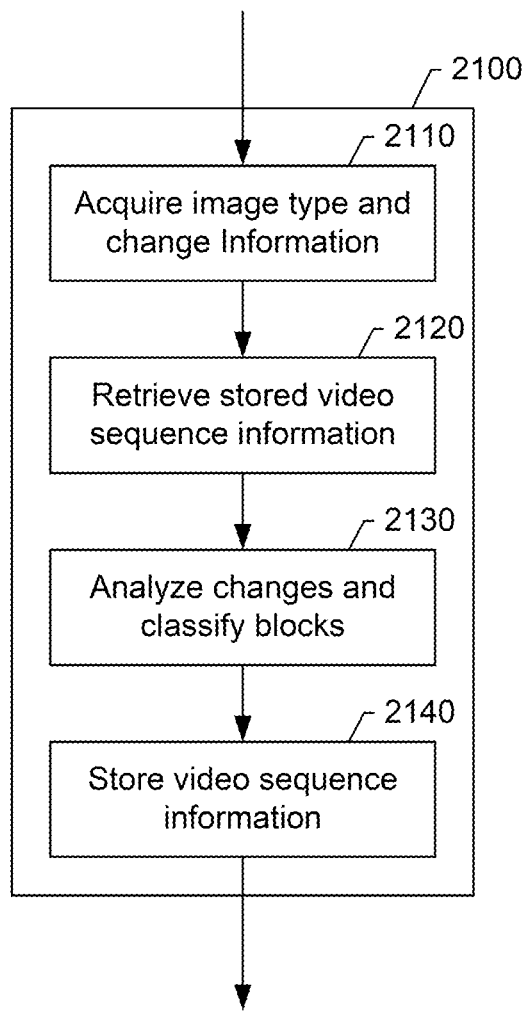
FIG. 23 shows a series of steps used to classify blocks in a region as either video type or other image type.

FIG. 23 shows an alternative embodiment of step 500 in FIG. 5 ('Acquire image information updates for region') labeled in FIG. 23 as step 2100 comprised of a series of smaller steps. Step 2100 classifies image blocks as either video type or another image type (such as text, picture or background previously discussed) so that video-related bandwidth analysis methods and progressive sequences may be applied to blocks of video type. As a first step 2110, image type and change information is acquired. Image type may be determined using image decomposition methods or graphical information provided by CPU sub-system 100 in FIG. 1, change detection module 210 in FIG. 2 or another method. In one embodiment, CPU 100 informs progressive encoding system 108 of the co-ordinates and timing of video sequences. Change information is provided by change detection module 210 in FIG. 2.

As a next step 2120, video sequence information is retrieved from memory such as a memory structure local to progression sequencer 300 in FIG. 3. In one embodiment, video sequence information comprises one or more region update counter values used to monitor for video refresh rates (as described by step 2130 below). In an embodiment described below and illustrated in FIG. 31, one or more video sequence stabilization counters are also retrieved for use in step 2130 below.

As next step 2130, block changes are analyzed along with previously image type information and blocks are further classified. In one embodiment, sequencer 300 incorporates a video block identification state machine that classifies blocks as video type based on image type and block change rate. In the embodiment, one or more region update counters count pre-defined integer multiples of the region update rate which may then be used as a basis for identifying expected video frame rates. As a simple example, consider a popular video frame rate of 30 frames per second. If the region update rate is known to be 90 updates per second, a region update counter that identifies a block change every 3 passes through step 2100 signals that the changed block may be classified as video type. In another embodiment, multiple region update counters monitor a block or sub-region for different possible video frame rates. In yet another embodiment, multiple region update counters monitor different areas of a region for different video frames that may be out of synchronization or at different frame rates. One method of accomplishing this is to associate a counter with each block.

Figure 33:
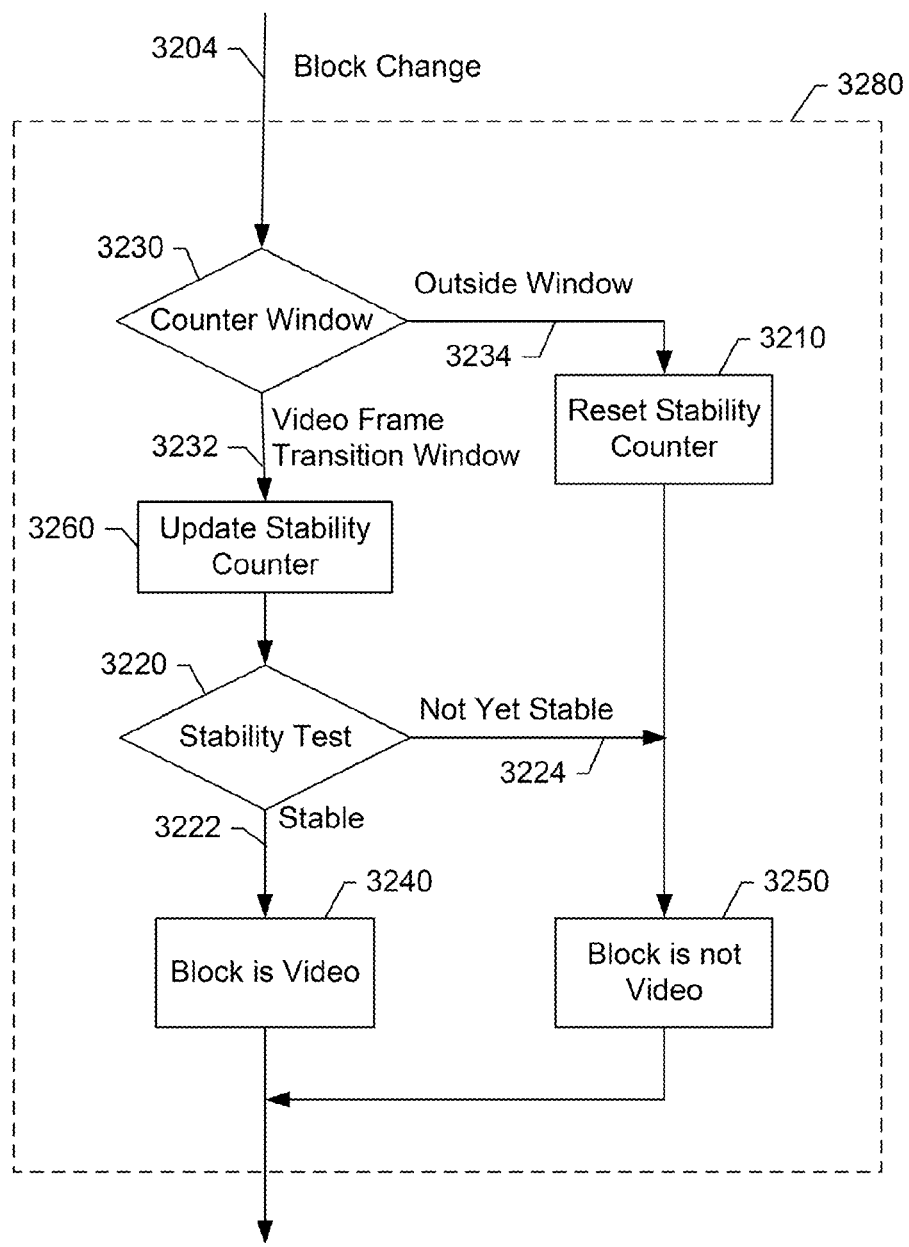
FIG. 33 shows an alternative embodiment that tests a changed block for stability prior to classification.

In the above embodiments, one or more update counter values retrieved in step 2120 are incremented. If the block has changed, the counter is compared against expected video timing. If the timing matches, the block is classified as video. In an embodiment where additional image type information is available, a second criterion for video identification is that a changed block consistently be of picture type. When a block changes, it is only classified as video type when it meets both frame timing and picture type requirements. If a block changes at a count that is not related to an expected video frame rate, the update counters are reset. In an embodiment described herein and illustrated in FIG. 31, an additional stabilization counter is incremented each time a block at a location changes at an expected video frame rate. The counter is then compared with a stabilization value and the block is only classified as video type once the video is identified as stable. The stabilization counter is reset if the block changes at a count that is not related to an expected video frame rate. In all cases, a block previously identified as video is re-classified as non-video if it is identified as not changing at the expected frame rate. FIG. 30 shows an embodiment of a method for classifying changed blocks using the logic described above. FIG. 33 shows an alternative embodiment including a stabilization analysis.

As a next step 2140, the updated video sequence information is stored. Updates include increments to update and stabilization counters. Note that updates to block classification need not be processed during step 2140 because block attributes are stored in build state table 310 at step 508 in FIG. 5.

FIG. 24 shows bandwidth analysis table 2200 that is an alternative embodiment to bandwidth analysis table 1200 in FIG. 12 using a single target quality line to maintain a constant bandwidth video sequence. In a constant bandwidth sequence, target quality line 2210 is used in step 930 of FIG. 9 for blocks classified as video type. Rather than maximizing image quality as described in step 920, the desired coding quality for video type blocks is set to a value specified by line 2210, i.e., the method uses an alternative embodiment to step 920 in which step 930 is followed directly by step 970 rather than maximizing the quality. Other embodiments are useful as well. For example step 920 may select between executing a maximum quality method or minimum bandwidth method based on additional configuration parameters. In another alternative embodiment, step 920 may use target quality line 2210 for early build stages but curtail encoding of higher coding quality increments when the next expected video frame is imminent. In one method, step 920 evaluates a region update counter (retrieved in step 2120) to determine whether to increment the coding quality level or hold the present level.

FIG. 25 is a graphical representation of the results of an encoding sequence that maintains constant bandwidth consumption for a series of blocks governed by the methods of FIG. 5 in conjunction with bandwidth analysis table 2200 in FIG. 24. The constant bandwidth encoding sequence shown uses table 2200 throughout and may be applied to a block of any type i.e., blocks are not necessarily of video type. (Later examples include a step which first identifies a video frame rate before a block is classified as video type and processed using a different table.)

Upper graph 2300 plots a change in coding quality level for a block of video type over time while lower graph 2350 has plot 2360 representing the bandwidth consumed to transmit the video block over the same period of time. Referring to graph 2300, each tick on the horizontal axis represents the arrival of a new frame of a rasterized image. The content of each block in the new frame may be a repeat of the content in a block at the same location of the previous frame or blocks may have updated content. In the described embodiment, the rasterized frame rate is higher than the video sequence frame rate and the content is shown to change every 7 frames. The vertical axis of graph 2300 represents increasing coding quality, for example using a peak signal to noise ratio (PSNR) metric. Referring to plot 2310 on graph 2300, an initial lossless state at lossless coding quality level 2302 is assumed, during which no bandwidth is consumed (as indicated during time period 2362 shown).

When a different block is first encountered at time 2332, the present coding quality level drops to initial coding quality level 2306 and a constant bandwidth progression using bandwidth analysis table FIG. 24 is initiated. In the example shown, blocks arriving at times 2334, 2336, 2338 and 2340 each interrupt the previous progression (i.e., periods 2320, 2322, 2324 and 2326 are shorter than period 2328 required to build a block to a final coding quality). Table 2200 is used for the progressive encoding of each block using same constant bandwidth 2352 in each case. In the example, the last block arriving at time 2340 is not interrupted and continues to increment using constant bandwidth 2352 until final coding quality level 2302 is reached at time 2342. While plot 2310 shows approximately equal increments in coding quality after each frame update cycle, equal coding quality increments may demand higher bandwidth at higher absolute quality levels. Therefore, in order to maintain constant bandwidth level 2352, the coding quality increment typically decreases as the absolute coding quality level of the block increases.

Benefits of the method described herein and illustrated in FIG. 25 include a simple progression and constant nominal network bandwidth consumption. The method may be applied to any incoming block sequence with a rapid block change rate (including video) to limit bandwidth consumption. However, in spite of each frame reaching a perceptually acceptable quality level for a brief period, the average quality level (quality level 2304 shown) may be too low to provide an overall acceptable perceived quality, especially in the case of an ongoing sequence such as a video stream. One obvious way of boosting average quality level 2304 is to increase bandwidth consumption level 2352 by allowing an increased number of quality increments for each frame update (using the different target quality lines as shown in FIG. 12). However, in applications where bandwidth availability is limited, other management methods such as those discussed below may provide improved performance.

FIG. 26 shows bandwidth analysis table 2400, an alternative embodiment to bandwidth analysis table 1000 in FIG. 10 with a single target quality line used to maintain a constant quality level video sequence. Target quality line 2410 is used in step 930 of FIG. 9 for blocks classified as video type. Rather than maximizing image quality as described in step 920, the desired coding quality for video type blocks is set to a value specified by line 2410, i.e., the method uses an alternative embodiment to step 920 in which step 930 is followed directly by step 970 rather than maximizing the quality. Other embodiments as described herein and illustrated in FIG. 24 are also useful.

FIG. 27 is a graphical representation of the results of an encoding sequence that maintains constant quality levels for a series of blocks of video type governed by bandwidth analysis table 2400 and step 2100 in FIG. 23. The sequence shown in FIG. 27 uses bursts of data to ensure a constant nominal video quality level as specified by target quality line 2410 in FIG. 24 is maintained. While the method demands high peak data rates, only part of the total available bandwidth is consumed which allows other high priority traffic to share the link.

As with FIG. 25, upper axes 2500 plots a change in coding quality over time and each tick on the horizontal axis represents the arrival of a new frame of a rasterized image as before. Plot 2560 on lower axes 2550 shows the bandwidth consumed to transmit the block over the same period of time. Referring to plot 2510 on graph 2500, an initial lossless state at lossless coding quality level 2502 is assumed, during which no bandwidth is consumed (time period 2562 shown). When a different block is first encountered at time 2532, a constant bandwidth progressive encoding sequence as described herein and illustrated in FIG. 25 is initiated and the present coding quality level drops to an initial coding quality level 2506. Progressive encoding is then used to encode and transmit the new block using constant bandwidth level 2552. However, a new block arrives at time 2534 following elapsed period 2520 where in the embodiment, period 2520 is an expected video frame period using methods described herein and illustrated in FIG. 23. The block arriving at time 2534 is classified as video type and a constant quality encoding sequence using table 2400 in FIG. 26 to govern a progression is initiated. In the described progression, the block is immediately encoded to desired coding quality level 2504 (corresponding with target quality line 2410) and then held constant until either another block arrives at the expected video frame rate (in which case the progression is repeated for the new block) or another block arrives at a different frame interval and is classified as non-video.

In FIG. 27, new blocks arriving at times 2536 and 2538 after periods 2522 and 2524 match the expected frame rate determined by period 2520 and are classified as video type. The blocks are encoded to coding quality level 2504 using bursts at bandwidth at level 2554 on graph 2550. After the last scene change at time 2538, the block at time 2540 arrives after period 2526 that is longer than the expected video frame period. The block is classified as non-video and encoding is completed using incremental steps (governed by table 2200) and constant bandwidth level 2552 once again. The result of the constant quality encoding method is that a perceptually acceptable constant quality level is delivered while the display latency is maintained at a low level at the expense of bursts in network bandwidth consumption. In the embodiment shown, the latency is single frame update period 2564 but higher latencies using lower bandwidth peaks are possible. In many applications, average bandwidth consumption level 2556 ensures that in spite of the traffic bursts, the average level is sufficiently low that the data stream may be multiplexed with other network traffic without causing congestion.

Note that the embodiment described by FIG. 27 shows one embodiment for achieving the objective of prioritizing the initial build steps for each frame in a video sequence. Other embodiments are also contemplated. For example, any of the bandwidth analysis tables described may be extended to include a weighing factor that favors the initial progression of new blocks of video type. As a second example, the inflection point on target quality line 2610 is governed by the video frame period to curtail encoding of higher coding quality increments when the next expected video frame is imminent.

FIG. 28 shows bandwidth analysis table 2600 used to maintain a video sequence that minimizes bandwidth waste. In the described sequence, target quality line 2610 is used in step 930 of FIG. 9 for blocks classified as video type. Rather than maximizing image quality as described in step 920, the desired coding quality for video type blocks is set to a value specified by line 2610, i.e., the method uses an alternative embodiment to step 920 in which step 930 is followed directly by step 970 rather than maximizing the quality. Other embodiments are also contemplated. For example, step 920 may select between executing a maximum quality method or minimum bandwidth method based on additional configuration parameters. In another alternative embodiment, step 920 may use target quality line 2610 as a minimum target quality line and then use methods described by FIG. 14 to maximize the coding quality during the incremental build stages.

FIG. 29 is a graphical representation of the result of an encoding sequence that minimizes bandwidth waste for a series of blocks of video type governed by bandwidth analysis table 2600 and step 2100 in FIG. 23. FIG. 29 is a variation on the constant quality sequence shown in FIG. 27 that minimizes wasted bandwidth by using nominal bandwidth to reach a nominal initial desired coding quality level and then delaying the completion of the progression. Upper axes 2700 plots a change in coding quality over time and each tick on the horizontal axis represents the arrival of a new frame of the rasterized image as before. Plot 2760 on lower axes 2750 shows the bandwidth consumed to transmit the image block over the same period of time.

Referring to plot 2710 on graph 2700, an initial lossless state at lossless coding quality level 2702 is assumed, during which no bandwidth is consumed as before. When a different block is first encountered at time 2732, a constant bandwidth progressive encoding sequence as described herein and illustrated in FIG. 25 is initiated and the present coding quality level drops to an initial coding quality level. Progressive encoding is then used to encode and transmit the new block using constant bandwidth level 2752. However, a new block arrives at time 2734 following elapsed period 2720 where in the embodiment, period 2720 is an expected video frame period using methods described herein and illustrated in FIG. 23. The block arriving at time 2734 is classified as video type and a minimum bandwidth waste encoding sequence using table 2600 in FIG. 28 is used to govern a progression. In the described progression, the block is incrementally encoded to desired coding quality level 2704 and then held constant until either another block arrives at the expected video frame rate (in which case the progression is repeated for the new block) or another block arrives at a different frame interval and is classified as non-video.

In FIG. 29, new blocks arriving at times 2736 and 2738 after periods 2722 and 2724 match the expected frame rate determined by period 2720 and are classified as video type. The blocks are incrementally encoded to coding quality level 2704 using bandwidth level 2752 on graph 2750. After the last scene change at time 2738, the block at time 2740 arrives after period 2726 that is longer than the expected video frame period. The block is classified as non-video and encoding is completed using incremental steps governed by table 2200 in FIG. 24 in the embodiment shown. This low waste method has lower peak and average bandwidth levels than the methods presented in FIG. 25 and FIG. 27. The advantage is that bandwidth is not wasted transmitting minor image quality improvements that are only present for a perceptually insignificant number of frame updates before a change in image content occurs. However, once the frame is stable, the image is improved to a final quality state.

FIG. 30 shows a variation of the embodiment described herein and illustrated in FIG. 29 that maintains a constant perceived quality after a block transition by delaying the decoding operation for a new block data by a number of frames after a transition. Upper axes 2800 plots a change in coding quality as measured at the output of an encoder. Each tick on the horizontal axis represents the arrival of a new frame of the rasterized image as before. Center plot 2860 on axes 2850 plots the change in quality over time at the output of a decoder as perceived by the viewer of the image using an equivalent quality scale. For convenience and without loss of generalization, the described embodiment assumes that the encoder and decoder are synchronized and that changes at the output of the encoder are immediately visible to a user. Plot 2890 on lower axes 2880 shows the bandwidth consumed to transmit the image block over the same period of time. Referring to plot 2810 on graph 2800, an initial lossless build state at lossless coding quality level 2802 is assumed, during which no bandwidth is consumed. When a different block is first encountered at time 2830, a constant bandwidth progressive encoding sequence as described herein and illustrated in FIG. 25 is initiated and the present coding quality level drops to an initial coding quality level as before.

Perceived quality plot 2860 starts at initial quality level 2852 which is an equivalent level to measured initial coding quality level 2802 for coding quality plot 2810. It also follows the same quality pattern as plot 2810 when the new block arrives at time 2830. A constant bandwidth progressive encoding sequence as described herein and illustrated in FIG. 25 uses bandwidth level 2882 on axes 2880 shown. When a new block arrives at time 2832 before final coding quality level 2802 has been reached, a constant perception quality sequence is initiated and the progressive encoding sequence described herein and illustrated in FIG. 29 is applied.

At the decoder, the new block is coded to coding quality level 2804 after three-frame delay 2884 rather than being decoded immediately. Output image quality graph 2860 is displayed at perceptually acceptable quality level 2854 after transition delay 2870 once all the build data required for the new block is received. Note that transition delay 2870 appears to be only two frames because data is still being communicated during the third frame. The sequence is repeated for each new block arriving at the expected video frame rate described herein and illustrated in FIG. 27. In the example shown, the new block arriving at time 2834 is displayed after 3 frames delay period 2886 and the block arriving at time 2836 is displayed after 3 frames delay period 2888. Other embodiments with different constant perceived quality levels and corresponding frame delays are also contemplated.

The result of the method shown in FIG. 30 is that constant perceptually acceptable quality level 2854 is maintained and the saw tooth quality pattern of FIG. 25 is eliminated at the expense of additional display latency. Because human perception cannot detect a delay in the frame sequence, perceptually acceptable quality level 2854 can be maintained during delayed decoding in spite of measured coding quality (plot 2810) being low over the same period due to the decoder not displaying the latest image block. Transition to the constant perception quality sequence may be dependent on available network bandwidth. If there is significant bandwidth available, there is no need to delay the image because acceptable quality may be obtained on the first frame change. In the case of limited bandwidth availability, delay 2870 is introduced. Care needs to be taken to limit the duration of delay 2870 as significant frame delays in video or video conferencing applications trigger a requirement for additional audio and video synchronization methods.

Figure 31:
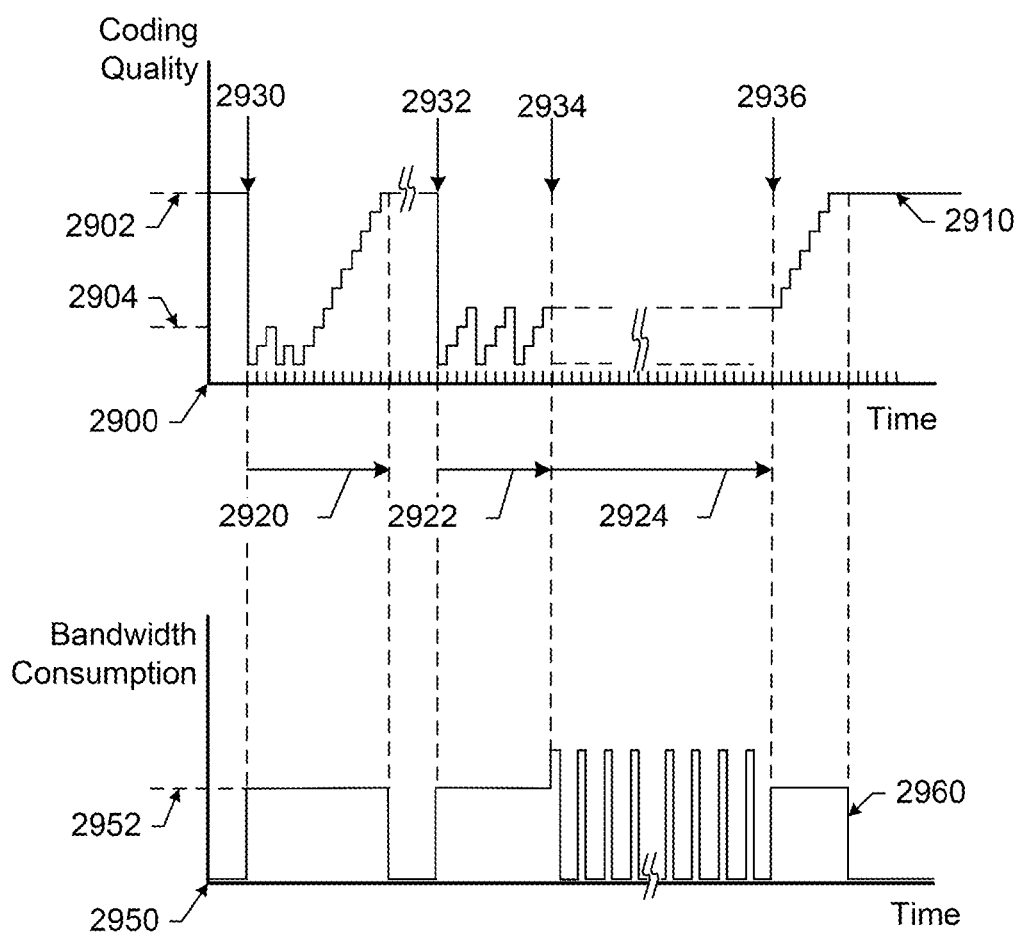
FIG. 31 is a variation on a constant video quality sequence that delays the classification of a series of blocks as video type until a block change interval has stabilized.

FIG. 31 shows a variation of the method described herein and illustrated in FIG. 27 where the transition from constant bandwidth encoding to constant quality encoding is delayed until the block change interval has stabilized. This ensures that a transition to constant quality encoding is not falsely triggered by a slow drawing operation in sub-system 100 (shown in FIG. 1), as might occur during the drawing of a complex still image.

Upper axes 2900 plots a change in coding quality over time and each tick on the horizontal axis represents the arrival of a new frame of the rasterized image as before. Plot 2960 on lower axes 2950 shows the bandwidth consumed to transmit the image block over the same period of time. Referring to plot 2910 on graph 2900, an initial lossless build state at lossless coding quality level 2902 is assumed, during which no bandwidth is consumed. When a different block is first encountered at time 2930, a constant bandwidth progressive encoding sequence as described by FIG. 25 is initiated and the present coding quality level drops to an initial coding quality level. Progressive encoding is then used to encode and transmit the new block using constant bandwidth level 2952.

However, unlike previously described embodiments, the block arriving at time 2930 contains initial image content associated with a complex still image that takes multiple frame updates to stabilize. During this time the image encoding is restarted multiple times (over time period 2920 shown) until the image stabilizes and builds to final level 2902 after several frames. Each time additional data arrives at a period not aligned with an expected video frame, a stabilization counter (as described in step 2130) is re-initialized.

The arrival of a new block at time 2932 represents the start of a video sequence. The quality drops as before and the encoder restarts a constant bandwidth progressive encoding on each block change (over time period 2922 shown). After a pre-defined number of frame counts at which a block changes at an expected video frame rate (the embodiment shown in FIG. 31 uses a stabilization counter of three frames), at time 2934 the block is identified as a video type and is encoded using a constant quality sequence governed by table 2400 (in FIG. 26) or another video-related encoding sequences such as the sequence governed by table 2600 in FIG. 28. The constant coding quality sequence continues over period 2924 until time 2936 where a non-video block is detected and the sequence transitions back to the constant bandwidth sequence, where a progression to final quality level 2902 is executed.

Figure 32:
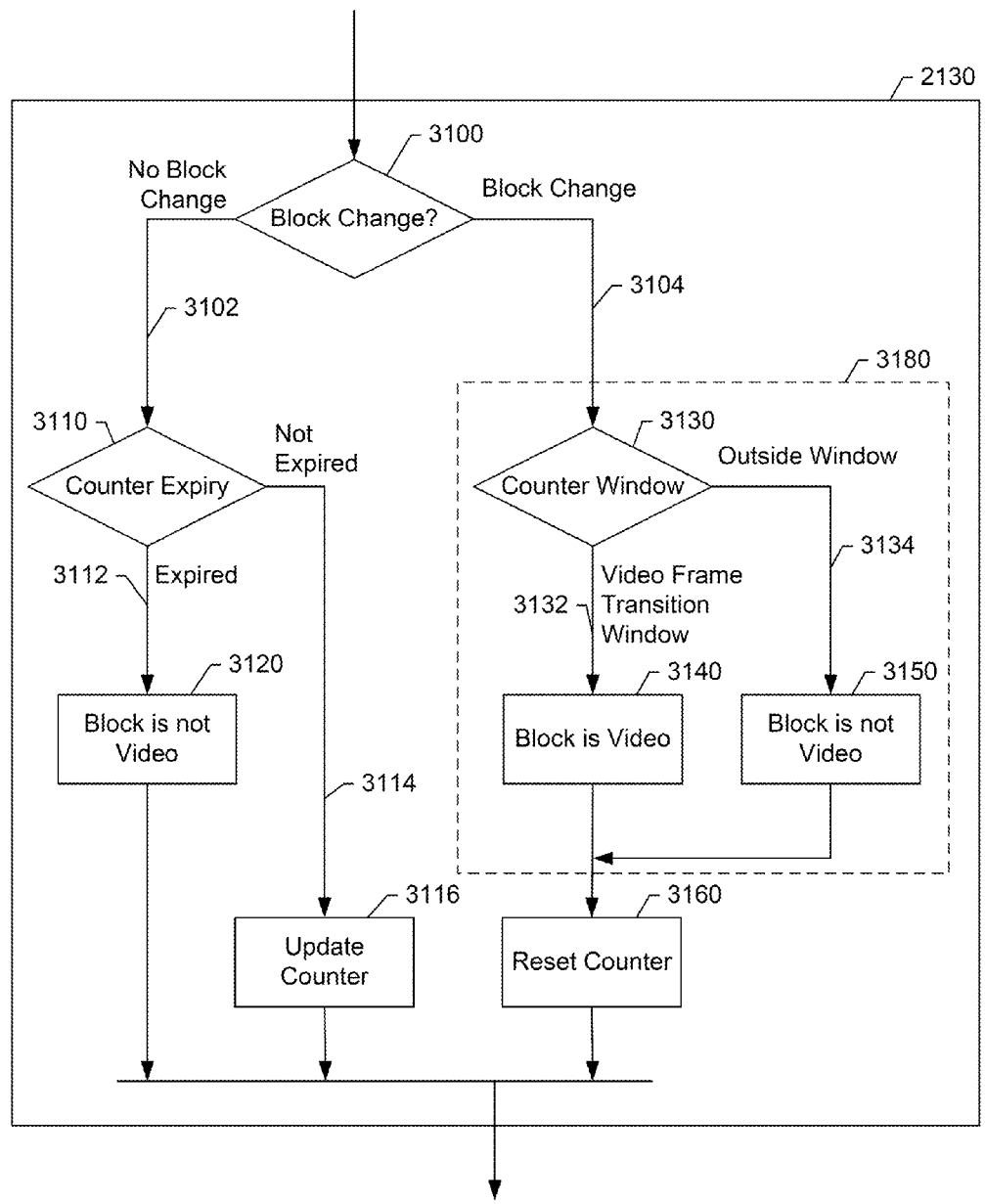
FIG. 32 is a diagram showing an embodiment of method for classifying a block as video or non-video based on block change rate.

FIG. 32 is a diagram showing an embodiment of method 2130 in FIG. 23 for classifying a block as video or non-video based on block change rate. As a first step 3100, a block is tested for change. In case 3102, the block has not changed so it is tested for the expiry of a counter that detects the end of an expected video frame period as step 3110. In case 3110, the counter has expired so the block is classified as non-video in step 3120. In case 3114, the counter has not expired so the counter is updated as step 3116 and the block is left in its previously classified state.

In case 3104, the block has changed so a counter test is conducted as step 3130 to determine if the change is at an expected video frame period. For example, a table may be used to store multiple values that correspond to expected update counts at multiples of expected frame rates. In case 3132, the period since the previous block change is within a time window corresponding with a video frame period so the block is classified as video in step 3140 and the frame counter is reset as step 3160. In case 3134, the period since the previous block change is outside a video frame period window so the block is classified as non-video in step 3150 and the frame counter is reset as step 3160.

Note that step 3180 classifies a changed block as video or non-video immediately after a single block transition at an expected frame rate. In an alternative embodiment such as the embodiment described below and illustrated in FIG. 34, a frame stability test is conducted before a block is classified.

FIG. 34 shows an alternative embodiment to step 3180 in FIG. 33. Step 3280 show a classification method for changed blocks that includes a stability check. Case 3204 is equivalent to case 3104 in FIG. 33 where a block is identified as changed. In step 3230, a counter test is conducted in the same way as step 3130 in FIG. 33. In case 3232 the period since the previous block change is within an expected video frame period window so the stability counter is incremented as step 3260 and stability test 3220 is conducted to determine if the video block is stable. In the described embodiment, a prerequisite number of sequential frames that meet the video block period criterion is counted by the stability counter.

In case, 3222, the video block is stable so it is classified as video as step 3240. In case 3224, the video block is not yet stable so it is classified as non-video in step 3250.

In case 3234, the period since the previous block change does not match a video frame period so the stability counter is reset as step 3210 and the block is classified as non-video in step 3250.

While a method and apparatus for progressive block encoding using region analysis has been described and illustrated in detail, it is to be understood that many changes and modifications can be made to various embodiments of the present invention, without departing from the spirit thereof.

The invention claimed is:

1. A method for encoding an image, comprising:

analyzing, for each block in a plurality of image blocks in an image frame of an image stream, block changes with respect to the same block in previous image frames of the image stream;

classifying each block as a non-video block of the image frame if each block has changed with respect to a corresponding block in an immediately previous frame in the image stream;

re-classifying, as a result of analyzing the block changes, each non-video block as a video block if each non-video block meets video block requirements that include each non-video block has changed over at least three previous frames at an expected video frame rate;

encoding each non-video block having a first image type identified by a first static image property to a lossless coding quality level;

encoding each non-video block having a second image type identified by a second static image property to a first lossy coding quality level;

encoding each video block to a second lossy coding quality level that is different than the first lossy coding quality level, wherein each of the lossless coding quality level, the first lossy coding quality level and the second lossy coding quality level define a measurable image quality level of a decoded output of a corresponding block at a client computer, wherein each block is determined to be changed if any pixel of each block has changed with respect to a same pixel in an associated frame of the previous image frames of the image stream, wherein the image stream is generated by a computer remote from the client computer and wherein the image frame comprises separate video insert, text and picture portions;

determining, for a subsequent frame of the image stream, a perceived quality value for a portion of blocks having the first image type and that have changed after an encoding of the image frame, wherein the perceived quality value is based on a duration since the change after the encoding;

mapping the perceived quality value to a desired coding quality level; and determining, using the desired coding quality level, a next coding quality level for a second portion of blocks having the second image type.

2. The method of claim 1, wherein the second image type is picture, and wherein the next coding quality level is a lossy coding quality level.

3. The method of claim 1, further comprising encoding the second portion of blocks to the next coding quality level, and transmitting the encoded second portion of blocks over a computer network connection.

4. The method of claim 1, wherein the next coding quality level is determined by computing a bandwidth required to meet the desired coding quality level.

5. The method of claim 1, further comprising identifying the first and the second static image properties by filtering each non-video block with image decomposition filters.

* * * * *